(12) United States Patent
Meggiolan

(10) Patent No.: US 7,861,599 B2
(45) Date of Patent: Jan. 4, 2011

(54) INSTRUMENT-EQUIPPED BICYCLE COMPONENT AND DETECTION UNIT FOR EQUIPPING SUCH A COMPONENT

(75) Inventor: Mario Meggiolan, Creazzo (IT)

(73) Assignee: Campagnolo, S.r.l., Vicenza (IT)

( * ) Notice: Subject to any disclaimer, the term of this patent is extended or adjusted under 35 U.S.C. 154(b) by 62 days.

(21) Appl. No.: 12/057,849

(22) Filed: Mar. 28, 2008

(65) Prior Publication Data

US 2008/0236293 A1    Oct. 2, 2008

(30) Foreign Application Priority Data

Apr. 2, 2007    (IT)    .......................... MI2007A0669

(51) Int. Cl.
*G01N 3/00*    (2006.01)
(52) U.S. Cl. .......................... 73/794; 73/760
(58) Field of Classification Search ............ 73/760–860
See application file for complete search history.

(56) References Cited

U.S. PATENT DOCUMENTS

| | | | | |
|---|---|---|---|---|
| 3,990,032 A * | 11/1976 | Fish et al. ....................... | 338/5 |
| 5,027,303 A * | 6/1991 | Witte ............................. | 702/44 |
| 5,036,714 A * | 8/1991 | Christoffers et al. ..... | 73/862.57 |
| 5,417,536 A * | 5/1995 | Cech ............................. | 414/21 |
| 5,571,056 A * | 11/1996 | Gilbert ........................... | 474/80 |
| 5,649,569 A * | 7/1997 | De Jager et al. .............. | 139/110 |
| 5,857,537 A * | 1/1999 | Matsumoto et al. .......... | 180/206 |
| 6,116,114 A | 9/2000 | Edwards | |
| 6,418,797 B1 * | 7/2002 | Ambrosina et al. ....... | 73/862.29 |
| 6,701,793 B2 | 3/2004 | Wallin et al. | |
| 7,683,274 B2 * | 3/2010 | Dellac et al. ................. | 177/211 |
| 2002/0053908 A1 | 5/2002 | Candy | |
| 2003/0233888 A1 | 12/2003 | Gierling | |
| 2006/0047271 A1 * | 3/2006 | McPherson et al. ............. | 606/1 |
| 2008/0314193 A1 * | 12/2008 | Meggiolan .................. | 74/594.1 |

FOREIGN PATENT DOCUMENTS

| | | |
|---|---|---|
| DE | 3722728 | 12/1988 |
| DE | 29507357 | 7/1995 |
| DE | 19719921 | 12/1997 |
| EP | 0983934 | 3/2000 |
| EP | 2005/026302 | 12/2005 |
| WO | 9945350 | 9/1999 |

* cited by examiner

*Primary Examiner*—Max Noori
(74) *Attorney, Agent, or Firm*—Volpe and Koenig, PC

(57) ABSTRACT

An instrument-equipped bicycle component has a detection unit for detecting at least one parameter representative of a stress exerted upon the component. The component may have a single piece or multiple parts that do not move relative to one another. The component may be mobile with respect to the bicycle frame while the bicycle is traveling, and the detection unit moves as a single piece with the component with respect to the bicycle frame. The detected parameter may be the torque applied by the cyclist to the aforementioned component through the bicycle pedals.

93 Claims, 21 Drawing Sheets

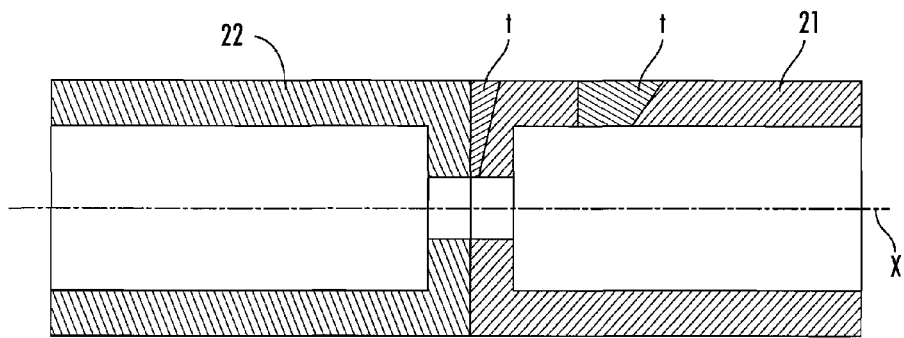
FIG. 11
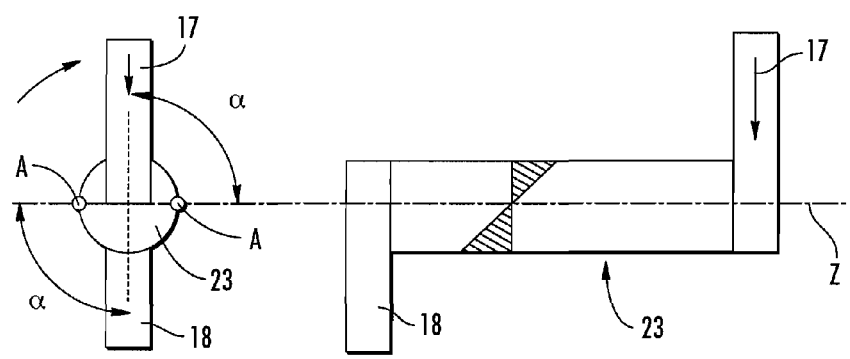
FIG. 12A     FIG. 12B
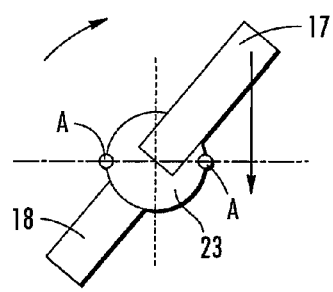
FIG. 12C

INSTRUMENT-EQUIPPED BICYCLE COMPONENT AND DETECTION UNIT FOR EQUIPPING SUCH A COMPONENT

FIELD OF INVENTION

The present invention relates to an instrument-equipped bicycle component. In particular, the invention relates to an instrument-equipped bicycle component for detecting the stresses imparted upon the component.

The invention also relates to a detection unit used to equip the aforementioned bicycle component and a bicycle comprising the aforementioned component.

BACKGROUND

Detecting stresses in bicycle components provides useful information for designing the component. Indeed, a constant requirement for manufacturers of bicycles and/or bicycle components, particularly racing bicycles, is to reduce as much as possible the overall weight of the bicycle and of the various components thereof while maintaining, if not even improving, the characteristics of structural strength of such components. In order to do this it is necessary to know the extent of the stresses to which the components are subjected. For example, in the case of rotating components of the bicycle, such as the shaft of the bottom bracket assembly, the crank arm or a component of the bicycle wheel, the torsional deformation of such components can be measured in order to find the extent of the aforementioned stresses.

The detection of the parameters representative of the stresses imparted by the cyclist upon a bicycle component while pedaling also allows the performance of the cyclist to be evaluated and possibly compared. For example, the measurement of the torsional deformation of a rotating component of the bicycle makes it possible to know the power developed by the cyclist while pedaling, and therefore to evaluate his performance.

SUMMARY

An instrument-equipped bicycle component has a detection unit for detecting at least one parameter representative of a stress exerted upon the component. The component is at least one part of a bicycle and parts defining the component do not move relative to each other.

Further characteristics and advantages shall become clearer from the following description of some embodiments thereof, that refer to the attached drawings.

BRIEF DESCRIPTION OF THE DRAWING(S)

FIG. 11 schematically illustrates the tensional state of a shaft of a bottom bracket assembly subjected to a torque.

FIG. 12a schematically illustrates the position of the crank arms of a bottom bracket assembly with respect to the shaft of FIG. 11 in a starting-thrust condition.

FIG. 12b schematically illustrates the tensional state of the shaft of FIG. 11 in the starting-thrust condition.

FIG. 12c schematically illustrates the position of the crank arms with respect to the shaft of FIG. 11 in a maximum thrust condition.

Figure 12D:
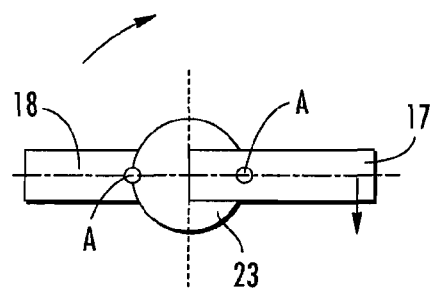

FIG. 12d schematically illustrates the position of the crank arms with respect to the shaft of FIG. 11 in an end-thrust condition.

Figure 13:
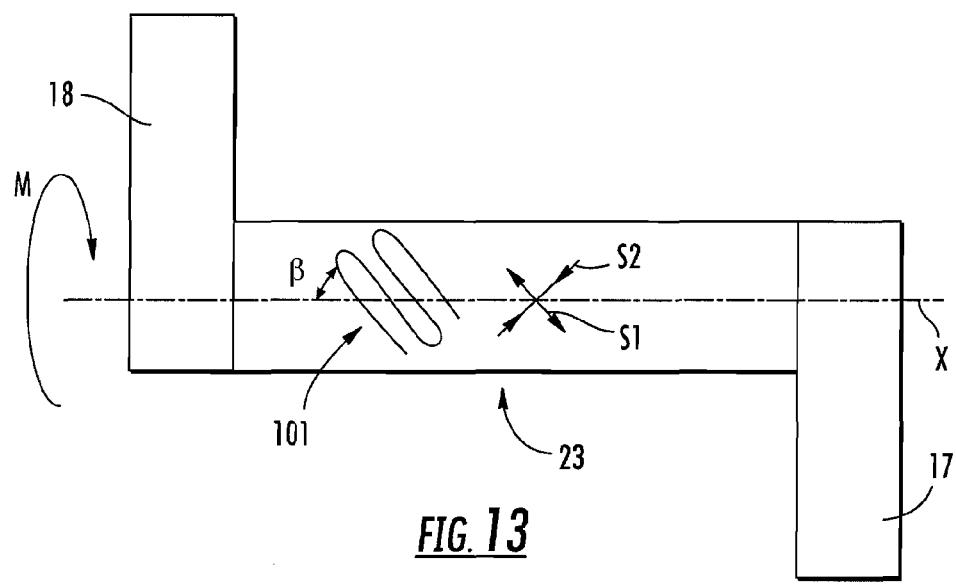

FIG. 13 schematically illustrates a preferred position of a strain-gauge on the shaft of FIG. 11.

Figure 14A:
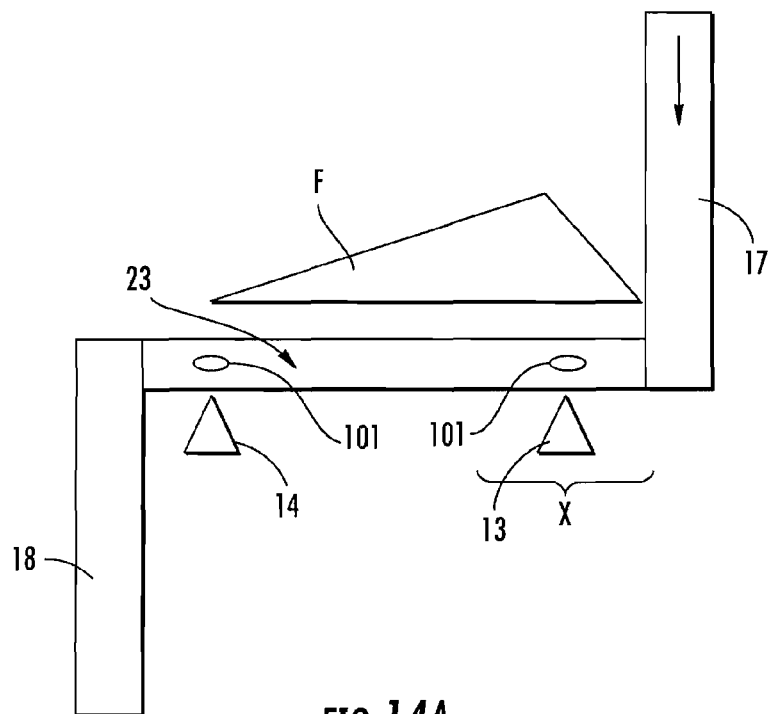

FIG. 14a schematically illustrates the tensional state of the shaft of FIG. 11 when subjected to a bending and torsional stress with the crank arms in a first operative position, and a preferred configuration of positioning of the strain-gauges.

Figure 14B:
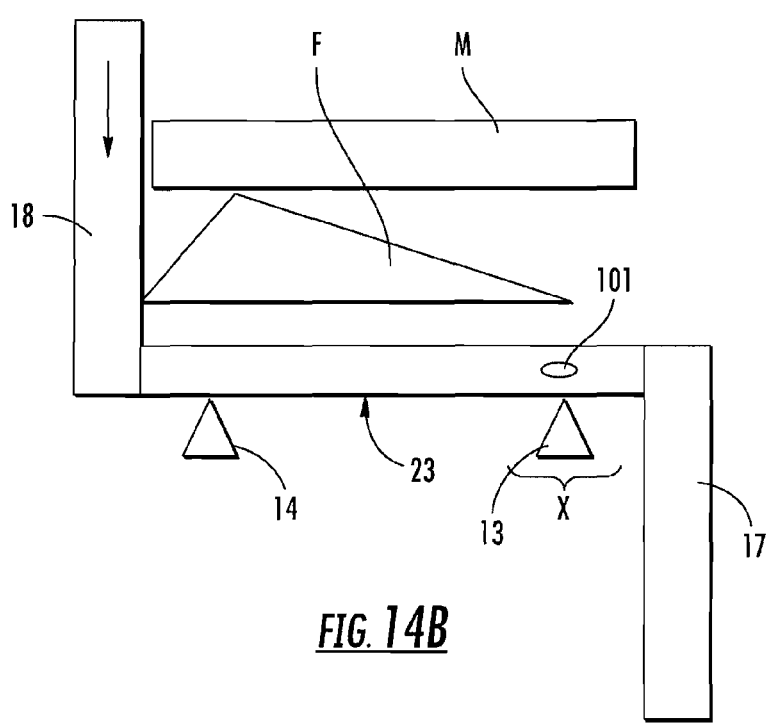

FIG. 14b schematically illustrates the tensional state of the shaft of FIG. 11 when subjected to a bending and torsional stress with the crank arms in a second operative position, and a preferred configuration of positioning of the strain-gauges.

Figure 15A:
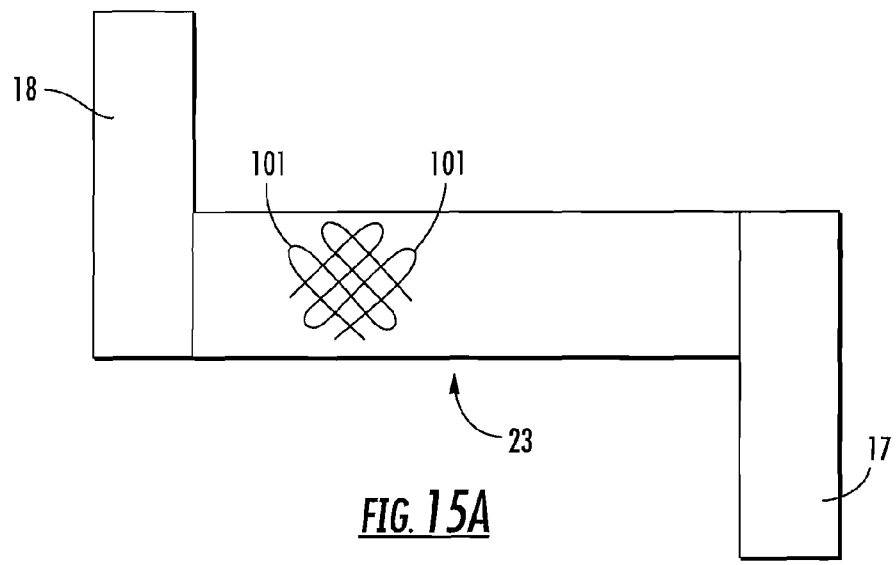

FIG. 15a schematically illustrates a further configuration of positioning of two strain-gauges on the shaft of FIG. 11.

Figure 15B:
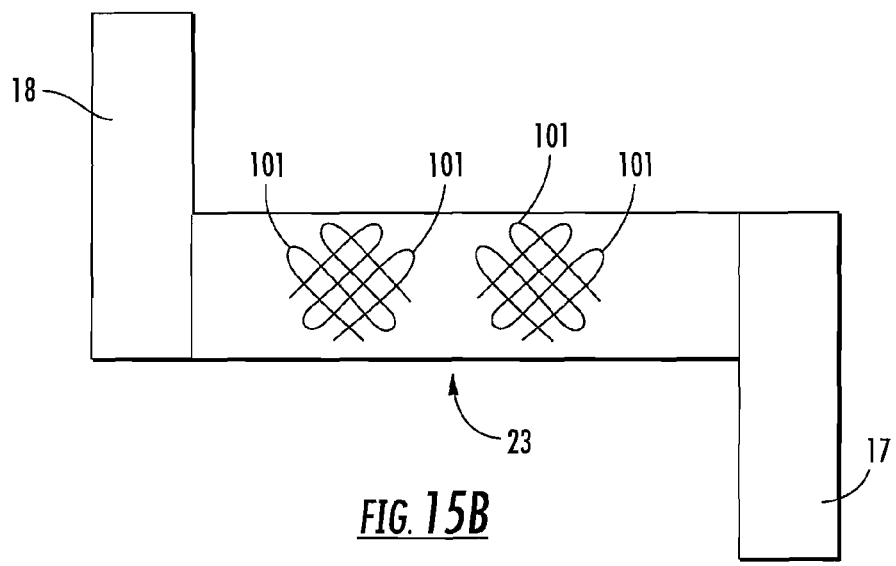

FIG. 15b schematically illustrates a particularly preferred configuration of positioning of the strain-gauges on the shaft of FIG. 11.

Figure 16:
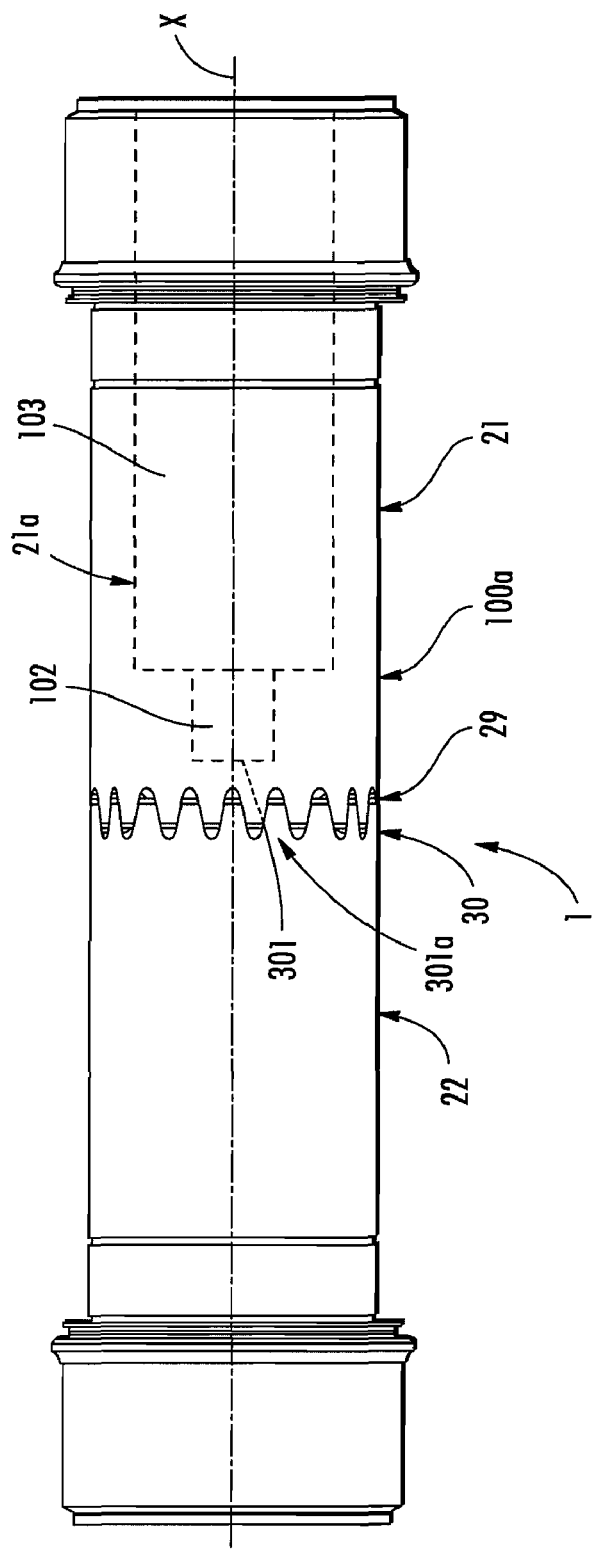

FIG. 16 is a side view of a further embodiment of the component.

Figure 17:
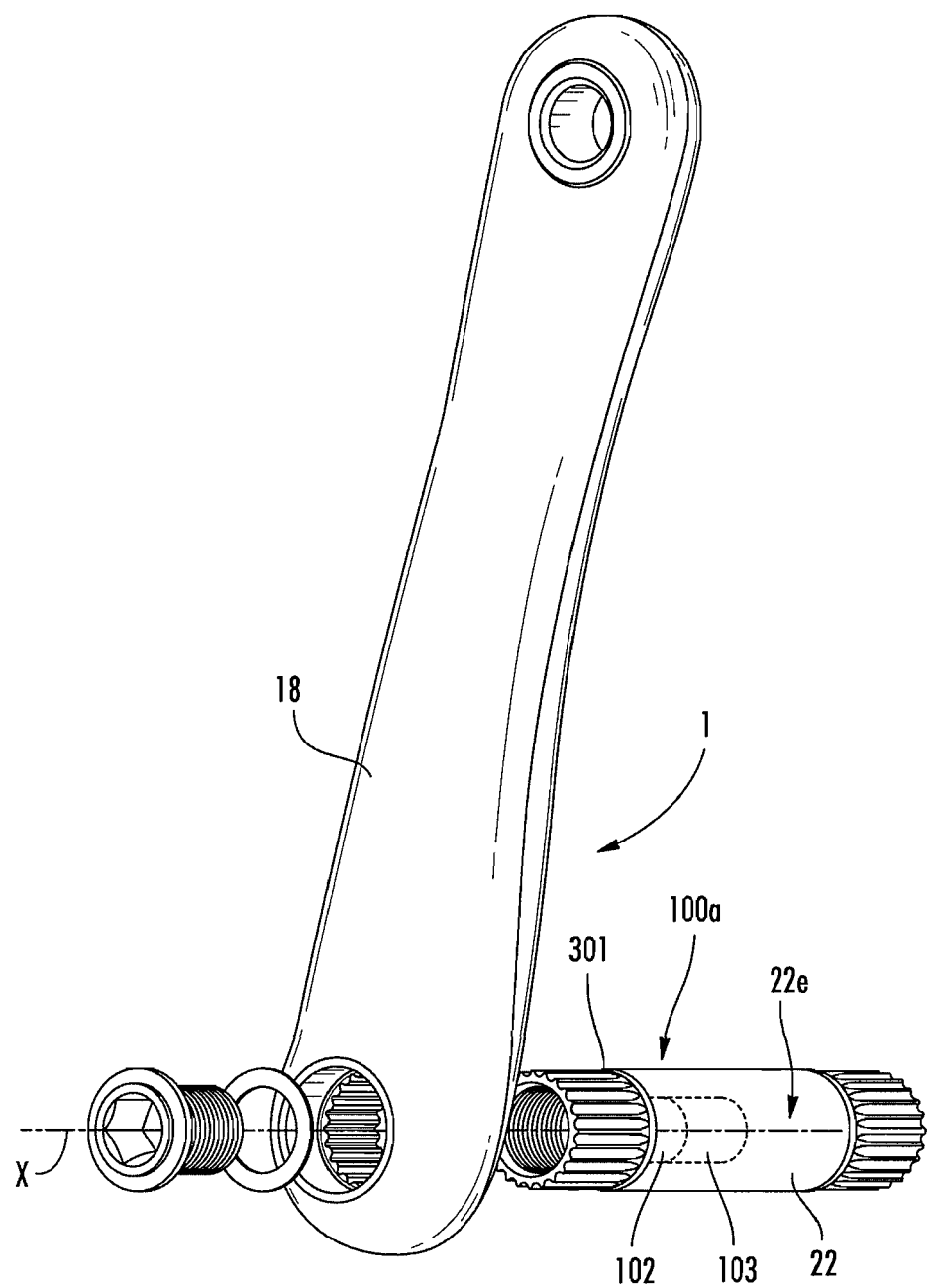

FIG. 17 is an exploded perspective view of a further embodiment of the component.

Figure 18:
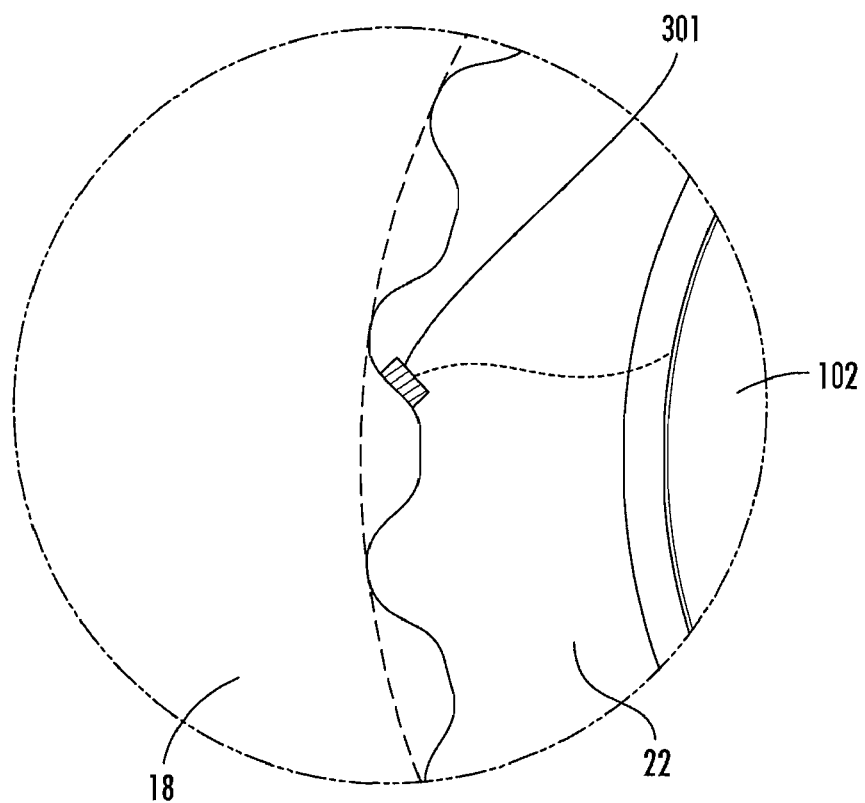

FIG. 18 shows an enlarged detail of FIG. 17.

Figure 19:
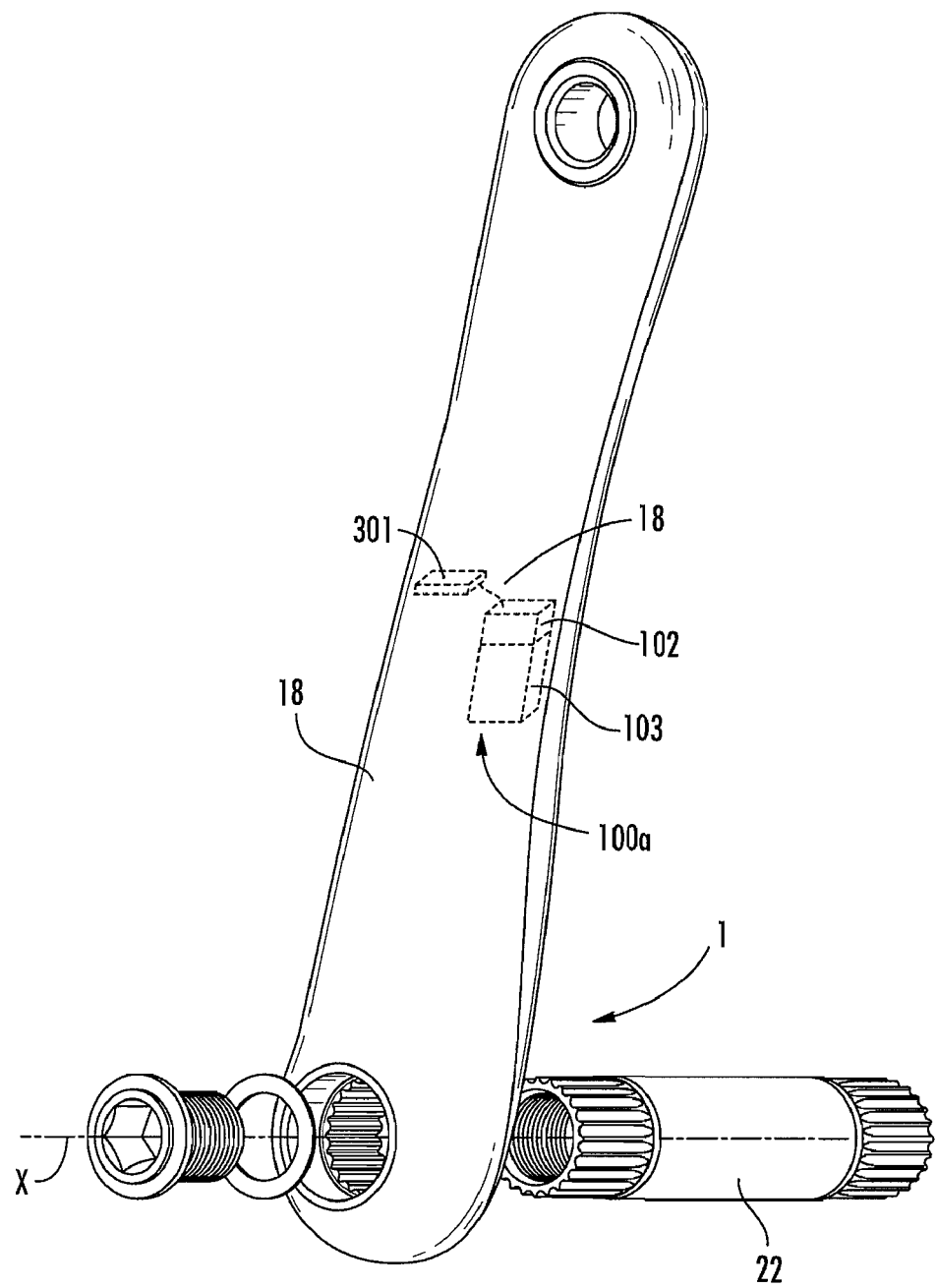

FIG. 19 is an exploded perspective view of a further embodiment of the component.

Figure 20:
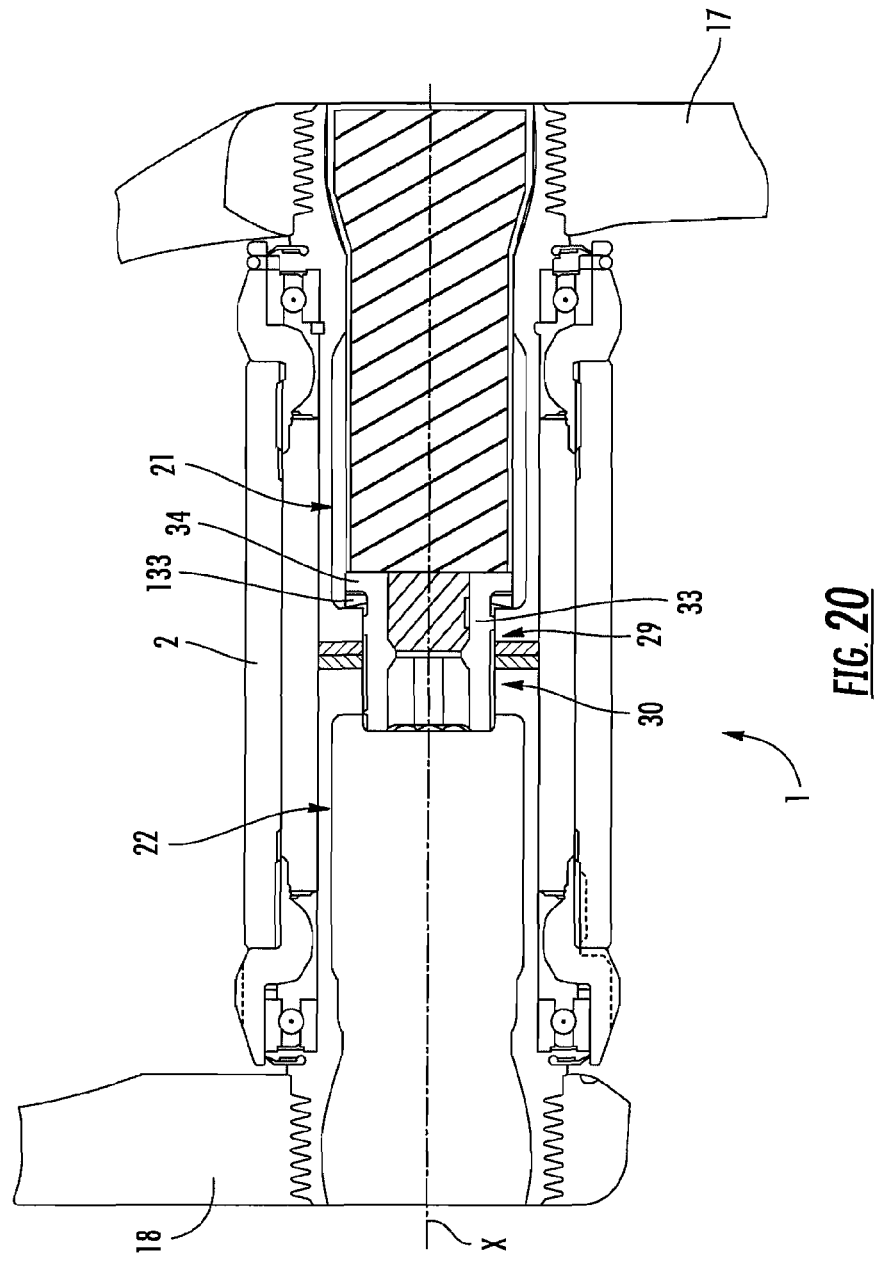

FIG. 20 is a schematic longitudinal sectional view of a further embodiment of the component.

Figure 21:
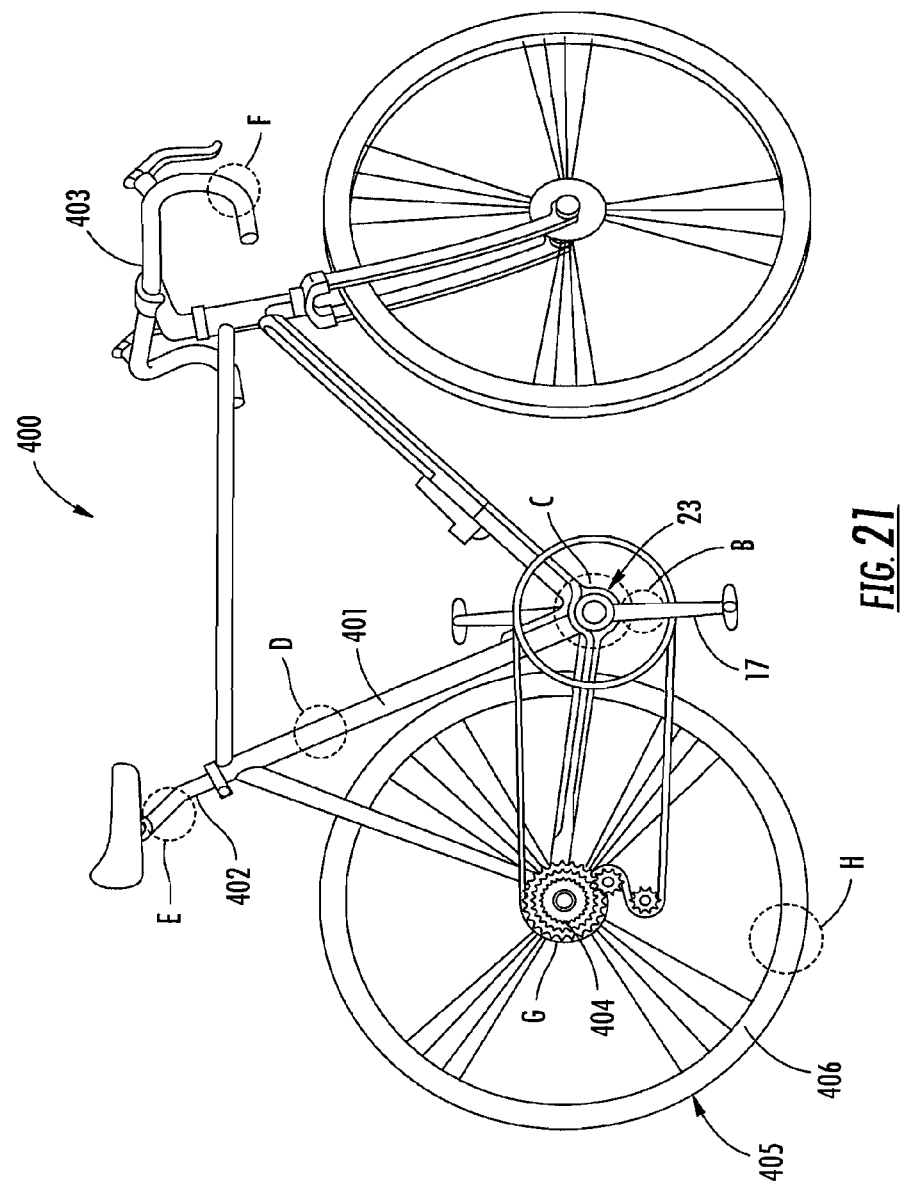

FIG. 21 is a side view of a bicycle that incorporates the component.

DETAILED DESCRIPTION OF THE PREFERRED EMBODIMENTS

Introduction

An instrument-equipped bicycle component comprises a detection unit of at least one parameter representative of a stress imparted upon the component, the component being a single piece or comprising more parts that do not move relative to one another.

Throughout the present description and in the following claims, the "component" may refer to any component of the bicycle that, while the bicycle is travelling, remains fixed with respect to the bicycle frame, such as the frame itself (or a part thereof), or the seat post, or any component that while the bicycle is travelling moves with respect to the frame, such as the shaft of the bottom bracket assembly or the crank arm.

Moreover, the component can be formed in a single piece (such as the crank arm), or in many pieces (such as the bottom bracket assembly). In the latter case the detection unit is associated with one of these pieces or with more pieces, such pieces, while such pieces are not moving relative to one another, or are moving as a single piece.

The entire detection unit is associated with parts of the component of the bicycle that do not move with respect to one another. In the steps of manufacturing and assembly of the instrument-equipped component on the bicycle, there is therefore only intervention on parts of the component that are intended to remain fixed with respect to the bicycle frame while the bicycle is traveling or that move as a single piece with respect to the frame.

The component may rotate and comprises a main body that can rotate about a rotation axis. In this case, the aforementioned detection unit rotates as a single piece with the aforementioned main body.

The detection unit comprises at least one generator of at least one signal (preferably an electrical signal), representative of the stress imparted upon the component, and more preferably, at least one transmission device for transmission of this signal outside of the detection unit. The detection unit also comprises at least one power supply device (such as an electrical energy source), and even may also comprise at least one processing unit of the signal generated by the signal generator.

The power supply device can be, for example, a battery, a piezoelectric element (in particular a crystal), or an induction winding excited by a fixed magnet arranged close to the rotating component. The signal generator can comprise of one or more strain-gauges or a piezoelectric element (possibly the same one that constitutes the power supply device). The transmission device can comprise a radio transmitter or cables with sliding contacts or solenoids.

In the case in which a battery is used as power supply device, the signal generator acts upon a constant electrical signal emitted by the battery to generate a signal representative of the stress imparted upon the component. On the other hand, in the case in which a piezoelectric element is used, since the piezoelectric element by its very nature autonomously generates an electrical signal directly proportional to the magnitude of the stress to which it is subjected, it acts both as a power supply device and as a signal generator. In this case the piezoelectric element is made so as to be compressed by the stress imparted by the cyclist upon the component while pedaling.

In a first embodiment of the component, the component is made from composite material and the detection unit is at least in part incorporated in the composite material. The signal generator comprises a piezoelectric element incorporated in the body of a crank arm made from carbon fiber.

The detection unit is at least in part housed in at least one cavity of the component. The elements of the component that are housed in the cavity of the component include the power supply device and the transmission device.

In the component, the signal generator is also housed in the aforementioned cavity, so that the entire detection unit is located inside the body of the component.

Nevertheless, alternative embodiments of the component are foreseen in which some of the aforementioned elements are associated with an outer surface of the component. In particular, an alternative embodiment is foreseen in which the signal generator is associated with the outer surface of the component. This can be used in cases in which one wishes to detect the tension generated by a torsional stress, as such a stress is of a greater magnitude precisely at the outer surface of the component, and therefore the arrangement of the signal generator right at such a surface allows for improved efficiency of the detection.

The detected parameter is a signal representative of the tensional state of the component. The signal is compared with a reference signal to indicate when critical tensions are reached, or to indicate that it is necessary to replace the component.

The parameter detected by the aforementioned detection unit is a signal representative of the torque imparted upon the component by the cyclist while pedaling.

In the embodiments, the component that is equipped is the shaft of a bottom bracket assembly, the crank arm of such an assembly, a component of the bottom bracket assembly itself, or a threaded element, such as a nut or a screw, used in the bottom bracket assembly. Nevertheless, alternative embodiments can be provided in which bicycle components other than those mentioned above are equipped, such as components of a wheel (for example the hub or the rim), the seat post, the handlebars or the frame of the bicycle.

In the specific case in which the component that is equipped is a bottom bracket assembly, both the power supply device and the transmission device are associated with the shaft of the bottom bracket assembly, whereas the signal generator is associated with each of the crank arms. This embodiment can be used in modern bottom bracket assemblies where the shaft is only subjected to torsion when the cyclist acts upon the left crank arm, the right crank arm being directly coupled with the front sprockets on which the chain acts to transmit motion to the rear wheel. In such assemblies therefore, if the signal generator were associated just with the shaft, a partial detection of the torque applied by the cyclist would be obtained. The positioning of the signal generators on the crank arms allows this problem of partial detection to be overcome.

The power supply device and the transmission device are defined by modular elements connected together through electrical connectors.

The signal generator and the transmission device are connected to one another through electrical cables.

The power supply device is an active energy source, i.e. a source capable of producing energy irrespective of the interaction between fixed elements and mobile elements. For example, a battery or a piezo-electrical crystal are active sources.

In another embodiment of the component, the power supply device is a battery. Such a battery may be a rechargeable type, and even of the type that is rechargeable by induction, so as to permit housing in an area that is airtight and insulated from the outside.

The signal generator comprises at least one strain-gauge connected to the battery. The signal generator comprises two strain-gauges arranged according to perpendicular directions (placed one above the other or arranged in diametrically opposite areas of the shaft), or two pairs of strain-gauges in which the strain-gauges of each pair are arranged according to perpendicular directions, or four strain-gauges connected so as to define a strain-gauge bridge, in particular according to a differential scheme, like a Wheatstone bridge.

In one embodiment of the component, the transmission device comprises sliding contacts to transmit to the outside the electrical signal generated, representative of the detected parameter.

Alternatively, the transmission device may comprise a radio frequency transmitter that transmits an electromagnetic signal remotely, for example to a bicycle-computer associated with the handlebars of the bicycle. In this case, the antenna is housed in at least one cavity of the component open towards the outside, so as not to be shielded by walls of the component.

Alternatively, the transmission device comprises a pair of solenoids adapted to generate a magnetic field.

The detection unit also comprises a power supply device for the transmission device. Such a power supply device is the same power supply device as for the detection unit, but an alternative embodiment of the component is provided in which the power supply device for the transmission device is an additional energy source.

The detection unit also comprises a signal amplifier arranged between the signal generator and the transmission device, and possibly also an analogue/digital converter operatively upstream of the transmission device. In this case, the detection unit preferably comprises a power supply device for such an amplifier. Such a power supply device is the same power supply device as for the detection unit, but an alternative embodiment of the component is provided in which the power supply device for the amplifier is an additional energy source.

The detection unit comprises a switch for actuating the power supply device. The use of such a switch allows the power supply device to be deactivated when one does not wish to carry out any detection, so as to minimize energy consumption of the power supply device.

The aforementioned switch comprises a movement sensor that activates the detection unit following a movement of the bicycle or of the component on which such a sensor is applied.

The detection unit also preferably comprises an operation indicator LED.

The detection unit also comprises a calibration or diagnosis switch, which can be defined by a button, a proximity switch, a reed-type switch, etc.

The detection unit also comprises a cadence sensor which is capable of detecting the speed of rotation of the component simultaneously to the torque applied to the component, so as to calculate the power developed by the cyclist.

In a second aspect thereof, a detection unit is configured so that it can be inserted in at least one cavity of the aforementioned component. Such a detection unit has, individually or in combination, all of the structural and functional characteristics discussed above with reference to the detection unit of the component.

DETAILED DESCRIPTION

Throughout the present description, the invention shall be described with reference to a bottom bracket assembly. Nevertheless, it should be understood that the invention can be applied to any bicycle component, including a crank arm, a shaft, a wheel component, the frame, the seat post, the handlebars, or any other part of the bicycle.

With reference to the various embodiments described hereafter, the expression "bicycle bottom bracket assembly" is used to indicate the assembly obtained by coupling two crank arms with the opposite ends of a shaft. The shaft can be made in a distinct piece from the crank arms or be formed as a single piece with one of the two crank arms. The shaft can also be formed as a single piece or be obtained by coupling together two or more shaft elements.

In this context, the component of the bottom bracket assembly consisting of a crank arm and a shaft (or shaft element), coupled together or formed as a single piece is identified with the expression "crank arm assembly."

Figure 1:
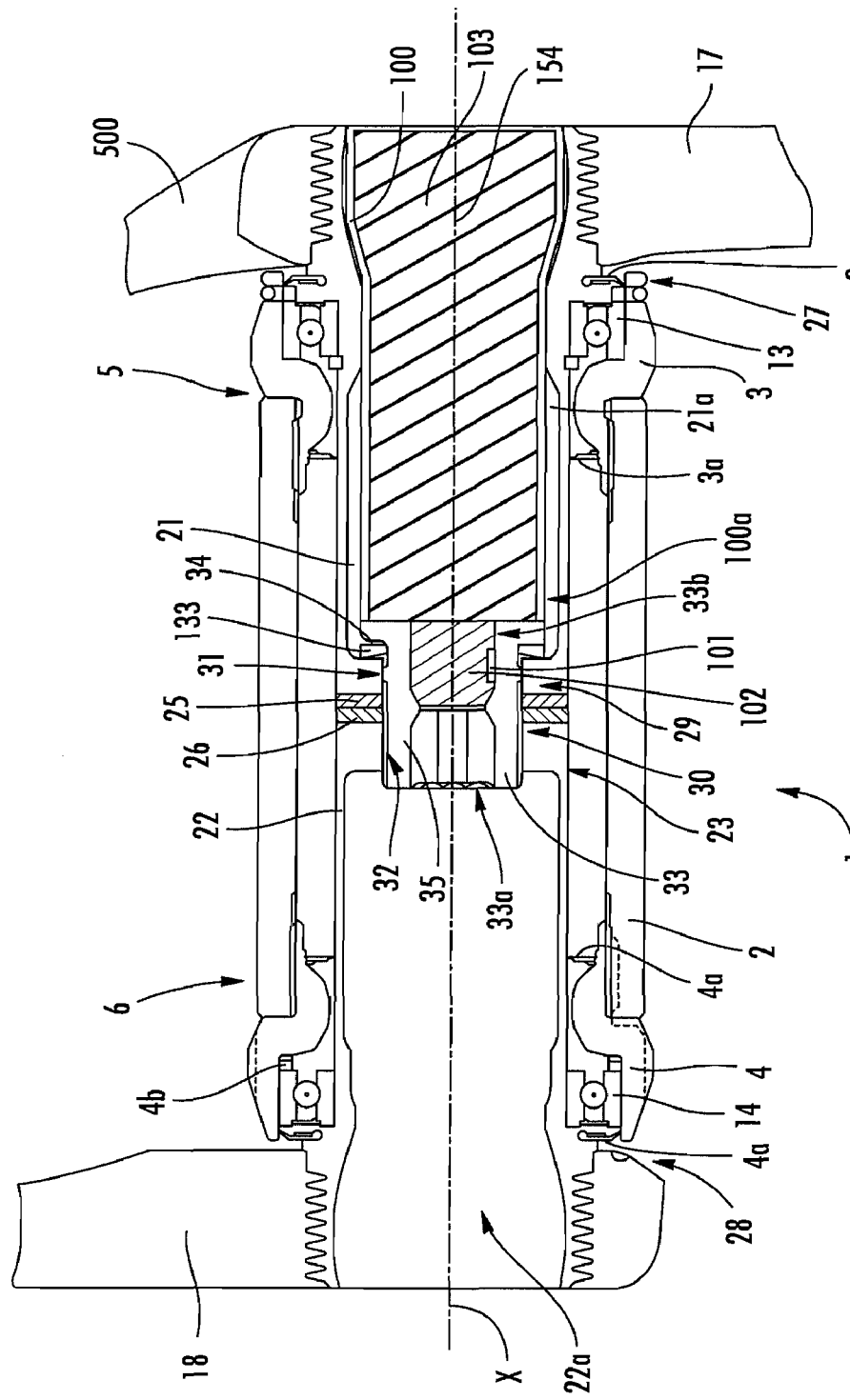
FIG. 1 is a schematic longitudinal sectional view of a first embodiment of a bicycle component, in this case a bottom bracket assembly.

With reference to FIG. 1, a bottom bracket assembly of a bicycle in accordance with a first embodiment is indicated as 1.

The assembly 1 comprises two crank arm assemblies 5, 6, each comprising a crank arm 17, 18, which may be solid or hollow and made from metal or composite material, and a hollow shaft element 21, 22. The front sprockets (not illustrated in detail but shown figuratively in FIG. 21), intended to engage with the chain are mounted on the right crank arm 17.

The shaft 23 of the bottom bracket assembly 1 comprises two shaft elements 21, 22, which are coupled together head-to-head as illustrated in FIG. 1, and a longitudinal axis X.

The crank arm assemblies 5, 6 are coupled together at first free end portions 29, 30 of the shaft elements 21, 22. At such end portions 29, 30, the shaft elements 21, 22 comprise respective front toothings 25, 26, preferably identical and of the Hirth type, which allow a precise centering between the crank arm assemblies 5, 6.

At the second free end portions 27, 28 of the shaft elements 21, 22, a threading is provided for the coupling with the crank arms 17, 18. The coupling between shaft elements 21, 22 and crank arms 17, 18 however, can take place in different ways, for example through gluing, by interference, or through coupling of grooved surfaces.

The bottom bracket assembly 1 is housed in a substantially tubular housing box 2 suitably formed in the frame of the bicycle. In the housing box 2, the crank arm assemblies 5, 6 and are supported in rotation about the longitudinal axis X through bearings 13, 14 fitted on the shaft elements 21, 22 at the respective end portions 27, 28 for coupling with the crank arms 17, 18. The bearings 13, 14 are operatively arranged between the shaft elements 21, 22 and respective adaptor rings 3, 4 screwed inside the opposite ends of the housing box 2. The bearings 13, 14 are positioned outside the housing box 2, each arranged between bearings 13, 14 and the respective shaft element 21, 22.

Suitable gaskets 3a, 4a associated with the adaptor rings 3, 4 are provided on axially opposite sides ensure the hermetic insulation of the bearings 13, 14 from the external environment. An undulated spring 4b is arranged between the outer ring of the bearing 14 and the adaptor ring 4.

The end portions 29, 30 of the shaft elements 21, 22 respectively define a through hole 31 and a threaded hole 32, both being coaxial with respect to the shaft elements 21, 22 (and therefore to the longitudinal axis X), for the insertion of a nut 33. Such a nut 33 ensures that the coupling between the shaft elements 21, 22 is maintained while pedaling.

The nut 33 is inserted into the through hole 31 and stops abutting a radial flange 34 thereof against a washer 133 that, in turn, abuts the inner wall of the shaft element 21, whereas the threaded shank 35 of the nut 33 screws into the threaded hole 32.

The nut 33 comprises a first portion 33a wherein a hole is defined, the hole having an inner surface of a size and shape to receive a closing tool, in particular an allen spanner. The nut 33 also has a second portion 33b wherein a substantially cylindrical hole is defined.

Further details of the bottom bracket assembly described above are described in European Patent Application No. 05026302 to the same applicant, the content of which is incorporated herein by reference.

The bottom bracket assembly 1 of FIG. 1 comprises a detection unit 100a for detecting the torque applied to the shaft 23 by the cyclist while pedaling. Such a detection unit 100a comprises first power supply device 103, which may be a battery, possibly of the rechargeable type, a signal generator consisting of one or more strain-gauges 101 associated with a nut 33, a processing unit 102 for processing of the signal generated by the strain-gauges 101 and a transmission device for transmission of such a signal to the outside, comprising in particular an antenna 154.

Preferably, the strain-gauges 101 are arranged so as to constitute a strain-gauge bridge, in particular a known type of bridge that uses four resistances in the differential configuration, such as a Wheatstone bridge. As shall be described in further detail below, the particular positioning of the resistances in the differential configuration allows a signal to be provided according to just the torsional deformations of the nut 33 with which the strain-gauges 101 are associated, i.e. not influenced by axial deformations due to traction or bending of the nut 33.

The strain-gauges 101 are fed by an electrical signal emitted by the battery 103 and act upon such a signal, modifying it according to the torsional deformation of the nut 33, thus generating a modified electrical signal in the form of current or voltage. Since the deformation of the nut 33 is proportional to the torque applied by the cyclist while pedaling, the electrical signal modified by the strain-gauges 101 shall also be proportional to such a torque.

The processing unit 102 is fed by the same battery 103, but alternatively it may contain its own dedicated battery.

The processing unit 102 is housed in the cylindrical hole of the second portion 33b of the nut 33. Alternatively, the processing unit 102 can be arranged outside of the nut 33, in a position adjacent to the battery 103.

The processing unit 102 processes the electrical signal generated by the strain-gauges 101 to then transmit it to the outside. By "processing," what is meant is any operation carried out on the signal, for example a simple amplification.

The antenna 154 exits from the processing unit 102 in the form of a cable which ends on the outer edge of the cavity 21a of the shaft element 21. In this way, the signal transmitted by the antenna 154 is not shielded by the walls of the shaft element 21.

In the embodiment illustrated in FIG. 1, the signal processed by the processing unit 102 is sent to the outside by the antenna 154 through a radio frequency transmission. The processing unit 102 in this case comprises an RF transmitter associated with the antenna 154. The signal transmitted can be of the analog type, or preferably of the digital type, in which case an A/D converter is provided upstream of the RF transmitter.

Figure 1A:
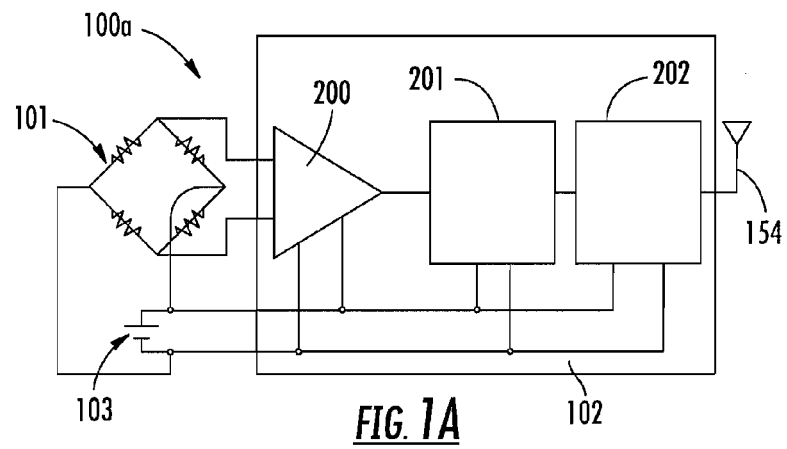
FIGS. 1a-1c illustrate block diagrams of alternative embodiments of the detection unit of the component of FIG. 1.

FIG. 1a shows in detail a block diagram of the embodiment of the detection unit 100a used in the bottom bracket assembly 1 of FIG. 1. In particular, the battery 103, the strain-gauges 101 connected in series to the battery 103, the processing unit 102 connected in series to the strain-gauges 101, and the antenna 154 coming out from the processing unit 102 are represented. The processing unit 102 comprises in particular an amplifier 200 of the signal generated by the strain-gauges 101, an A/D converter 201 and a RF transmitter 202, all fed by the battery 103.

Figure 1B:
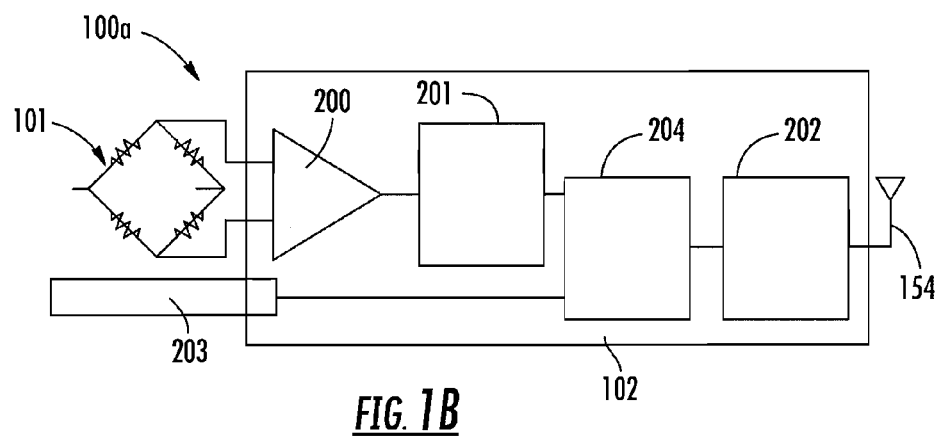

FIG. 1b shows in detail a block diagram of an alternative embodiment of the detection unit 100a that can be used in the bottom bracket assembly 1 of FIG. 1. For the sake of clarity of illustration, in FIG. 1b the power supply battery and the electrical power supply circuit associated with it have not been represented. Such a circuit and such a battery are however, present and are completely identical to those illustrated in FIG. 1a.

The embodiment of FIG. 1b differs from the one illustrated in FIG. 1a in that it also comprises a cadence sensor 203 that supplies a signal proportional to the rotation speed of the shaft 23, and a processor 204, operatively arranged between the converter 201 and the RF transmitter 202, intended to receive both the cadence signal generated by the cadence sensor 203 and the torque signal generated by the strain-gauges 101 and suitably amplified by the amplifier 200 and digitalised by the A/D converter 201. The processor 204 analyzes the torque signal to process it into a signal proportional to the power exerted by the cyclist. Preferably, the power signal is an average power signal and is transmitted to the outside of the detection unit 100a only at predetermined time intervals, to limit the consumption of the battery 103. Moreover, the cadence sensor 203 is only activated when there is a rotation of the shaft 23 and therefore also acts as a switch of the detection unit 100a.

Figure 1C:
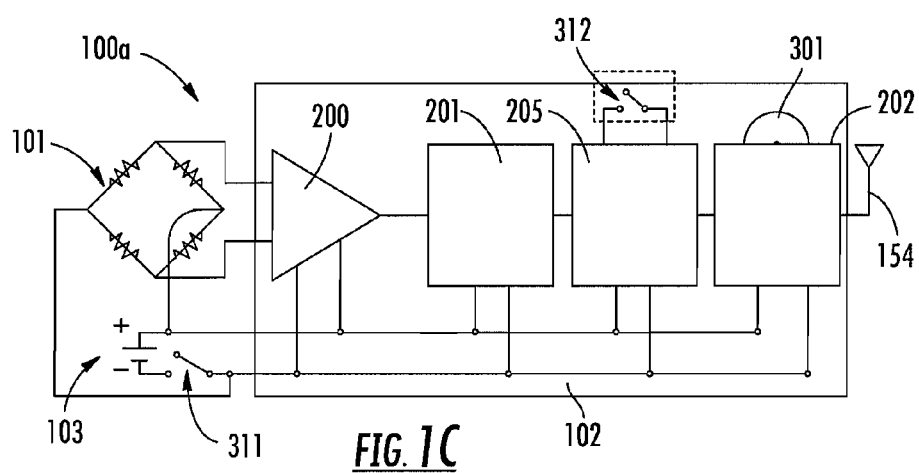

FIG. 1c shows in detail a block diagram of an alternative embodiment of the detection unit 100a that can be used in the bottom bracket assembly 1 of FIG. 1. For the sake of clarity of illustration, in FIG. 1c the power supply battery and the electrical power supply circuit associated with it have not been represented. Such a circuit and such a battery are, however, present and are identical to those illustrated in FIG. 1a.

The embodiment of FIG. 1c differs from the one illustrated in FIG. 1a in that the processing unit 102 comprises a processor 205, operatively arranged between the converter 201 and the RF transmitter 202, which continuously receives the torque signal generated by the strain-gauges 101 and suitably amplified by the amplifier 200 and digitalised by the A/D converter 201. The processor 205 analyses this signal to calculate the pedaling cadence and therefore the average power developed by the cyclist. The power signal is transmitted to the outside through the antenna 154 only at predetermined time intervals.

Irrespective of the specific embodiment of the detection unit 100a, it can comprise an LED 310 (FIG. 1c), that indicates the operating state of the unit (for example, if it is active a signal transmission to the outside) and/or the charging state of the battery 103.

It is also possible to provide a switch 311 (FIG. 1c), between the battery 103 and the remaining part of the detection unit 100a. Such a switch can be manual and actuated by the cyclist when necessary, or as already stated it could be associated with a cadence sensor (or more generally with a movement sensor), to be actuated in closure only when the bicycle moves. Also is foreseen the use of a switch (mechanical, proximity, a switch 312 of the reed type, illustrated in FIG. 1c, etc.), the actuation of which commands the start of the automatic calibration or diagnosis operations.

Again, with reference to the embodiment illustrated in FIG. 1, the signal coming out from the detection unit 100a is transmitted by radio frequency, through the antenna 154, to other command/control systems associated with the bicycle. For example, the signal coming out from the detection unit 100a can be used by a cyclecomputer associated with the handlebars of the bicycle to be combined with a signal proportional to the instant value of the rotation speed of the shaft 23 and thus provide an instant power value exerted by the cyclist while pedaling.

Figure 2:
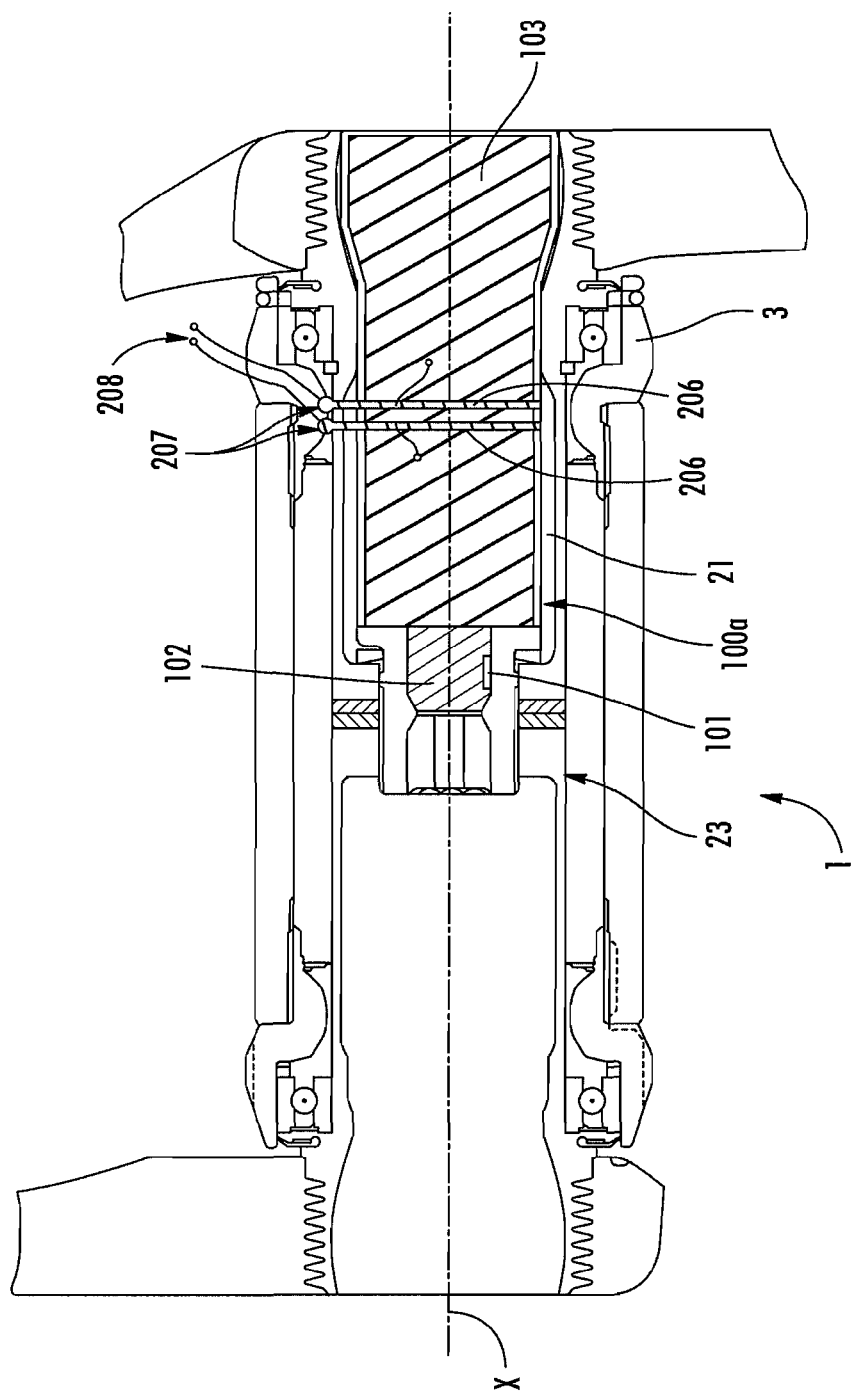
FIG. 2 is a schematic longitudinal sectional view of a second embodiment of the bicycle component.

The transmission of the signal coming out from the detection unit 100a to the other command/control systems provided in the bicycle can, however, take place according to means other than that by radio frequency as illustrated and described with reference to FIGS. 1, 1a, 1b and 1c. For example, in the embodiment illustrated in FIG. 2 the transmission of the signal coming out from the detection unit 100a takes place through the use of sliding contacts. In particular, on the outer surface of the shaft element 21 two or more circular pathways 206 (in the form of contact rings), are provided which are electrically insulated from one another and electrically connected to the processing unit 102. Close to the adaptor ring 3, corresponding sliding contacts 207 are positioned, made for example in the form of brushes, which make the electrical connection with the circular pathways 206 when the shaft element 21 is rotating. Two insulated wires 208 cross the adaptor ring 3 to carry the signal detected by the detection unit 100a to the outside. FIG. 2 is otherwise identical to the embodiment illustrated in FIG. 1.

Figure 3:
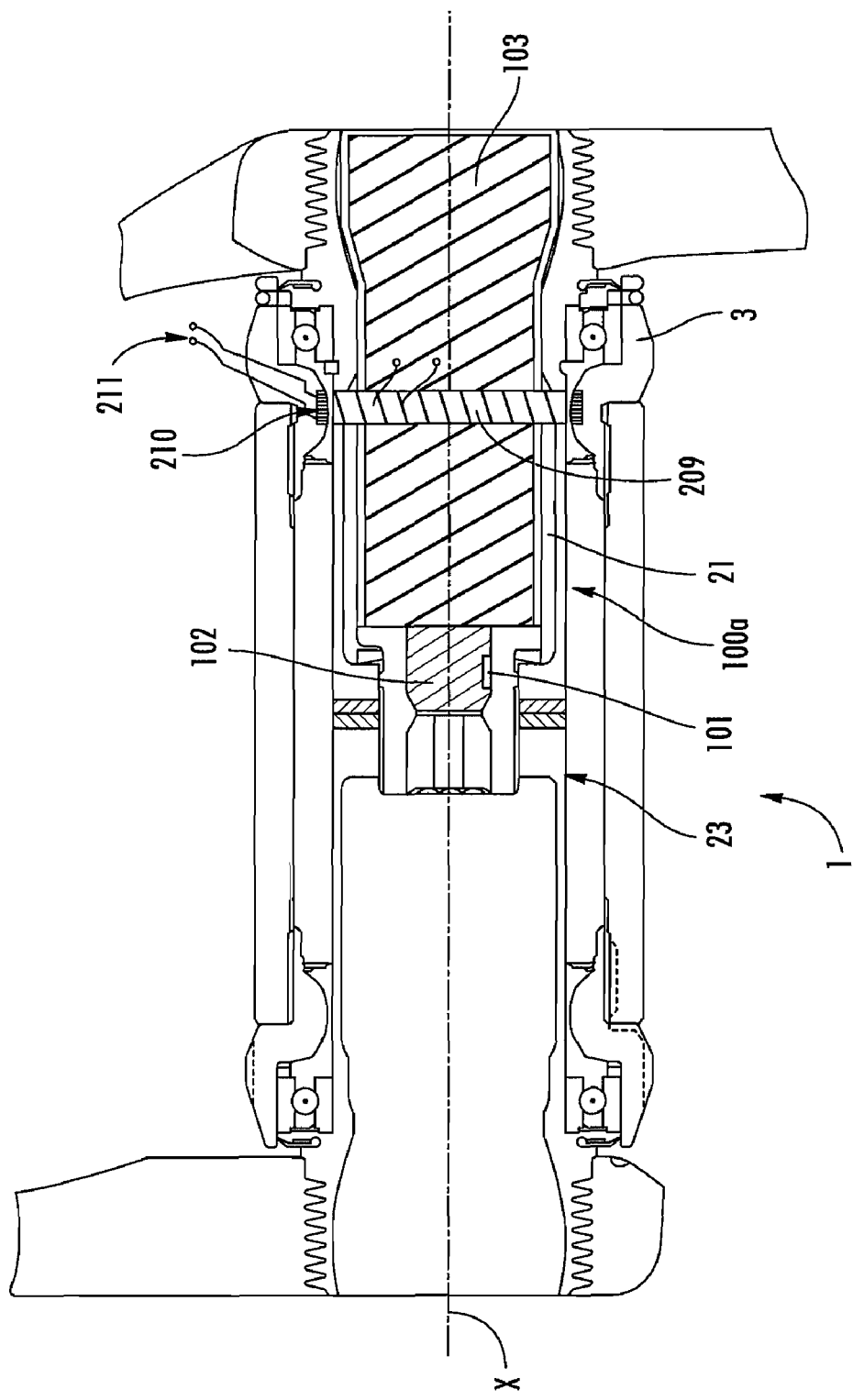
FIG. 3 is a schematic longitudinal sectional view of a third embodiment of the bicycle component.

In the embodiment illustrated in FIG. 3, the transmission of the signal coming out from the detection unit 100a, on the other hand, takes place through the use of solenoids. In particular, on the outer surface of the shaft element 21, a solenoid 209 is wound that is electrically connected to the processing unit 102. The solenoid 209 rotates as a single piece with the shaft element 21. At the adaptor ring 3 a corresponding fixed solenoid 210 is provided. The two solenoids 209 and 210 substantially define the primary and secondary windings of a transformer. The signal detected by the detection unit 100a is transmitted through the solenoid 209, to the fixed solenoid 210, and from here transmitted through two insulated wires 211 that cross the adaptor ring 3, to the outside. In this case, it is possible to foresee that in addition to transmitting the signal detected by the detection unit 100a to the outside, the transformer is used in the opposite sense to supply power supply energy from the outside to the detection unit 100a. In the two wires 211 there shall therefore be both a torque signal and a power supply signal. The detection unit 100a shall in this case be provided with at least one storage element (for example, a condenser), of the energy coming from the outside. FIG. 3 is otherwise completely identical to the embodiment illustrated in FIG. 1.

Going back to the embodiment of FIG. 1, the strain-gauges 101, the processing unit 102, and the battery 103 (and therefore substantially the entire detection unit 100a), are all contained in a case 100 shaped to be inserted into the cavity 21a of the shaft element 21 of the right crank arm assembly 5 when already assembled on the bicycle. The transmission of the power supply energy and of the signals between the various elements of the detection unit 100a may be carried out, for example, through cables.

The detection unit 100a has at least one interface surface not covered by the case 100 (and therefore exposed to the outside), on which the strain-gauges 101 are positioned, so that they can come into contact with the inner surface of the cylindrical hole of the second portion 33b of the nut 33. The surface of the strain-gauges 101 in contact with the inner surface of the cylindrical hole of the second portion 33b of the nut 33 has an adhesive substance that ensures the cohesion of the strain-gauge 101 with such a surface. The strain-gauges 101 must follow the deformation of the nut 33 while pedaling and therefore the adhesion between the strain-gauges 101 and the inner surface of the cylindrical hole of the second portion 33b of the nut 33 must be sufficiently strong.

Alternatively, the detection unit 100a can be associated with the nut 33 before it is used to assemble the bottom bracket assembly 1. In this case, the strain-gauges 101 are first applied to the inner surface of the cylindrical hole of the second portion 33b of the nut 33 and then connected with the processing unit 102 and with the battery 103. In this case an area for the insertion of an assembly tool, in particular an allen spanner, is provided in the nut 33.

The nut 33, which is fixedly connected to the detection unit 100a, can be inserted from the right (with reference to FIG. 1), in order to be screwed into the threaded hole 32. Such screwing takes place by reaching from the left the inner grooved surface of the first portion 33a of the nut 33 with the assembly tool.

Alternatively, it is possible to mount the strain-gauges 101, instead of directly on the inner surface of the nut 33, on an intermediate support element (for example a rubber buffer), to be glued to the nut 33. In this case, the deformation of the nut 33 is transmitted to the strain-gauges 101 by means of such an intermediate support element, which must therefore be made from a material with physical characteristics with respect to the material from which the nut 33 is made such as to follow the deformations of the latter (i.e. it must not be rigid).

There is an alternative embodiment that is not illustrated in which the positioning of the detection unit 100a with respect to the bottom bracket assembly 1 is a mirror image of that in FIG. 1. In this embodiment, the case 100 can be inserted into the cavity 22a of the shaft element 22 associated with the left crank arm 18, and the nut 33 has the portion 33b with the substantially cylindrical hole at the shaft element 22 and the portion 33a with the inner surface shaped to receive the closing tool at the shaft element 21 associated with the right crank arm 17.

Figure 4:
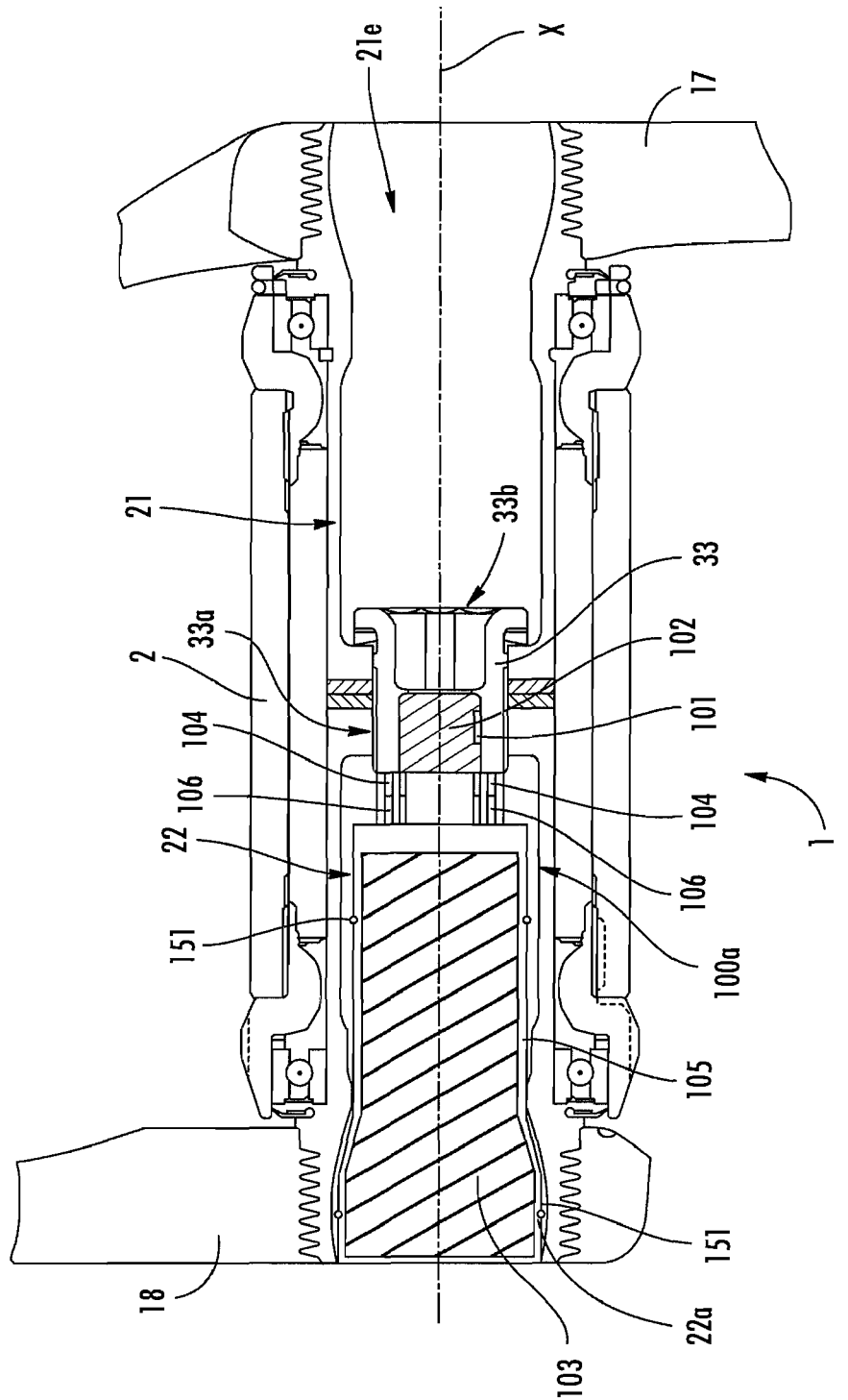
FIG. 4 is a schematic longitudinal sectional view of a fourth embodiment of the bicycle component.

FIG. 4 shows an alternative embodiment of the bottom bracket assembly 1. In this embodiment, elements corresponding to those illustrated in FIG. 1 are indicated with the same reference numerals.

The embodiment illustrated in FIG. 4 differs from the one illustrated in FIG. 1 by the different arrangement of the detection unit 100a and in that it uses a replaceable and possibly rechargeable battery 103. It should be noted that the battery 103 is no longer fixedly associated with the processing unit 102 and strain-gauges 101, but can be connected to them through connectors 106 (for example male connectors), that transport the power supply energy both to the strain-gauges 101 and to the processing unit 102. For this purpose, the processing unit 102 comprises connectors 104 (for example female connectors), intended to cooperate with the connectors 106 of the battery 103. The exchange of signals between strain-gauges 101 and the processing unit 102 continues to take place preferably via cables, so as to avoid dispersion of the signal due to the low order of magnitude of the signal (typically microvolts), supplied by the strain-gauges 101, as would happen if the signal were transmitted through connectors.

The battery 103 is housed in a casing 105. In order to avoid infiltrations of humidity or dirt that could oxidise the connectors 104, 106, gaskets may be used 151, for example in the form of O-rings, arranged between the casing 105 and the inner surface of the shaft element 22. The number of gaskets (two in FIG. 4), and the position with respect to the shaft element 22 can be different from that which is illustrated in FIG. 4.

The use of a battery 103 provided with connectors, like the one illustrated in FIG. 4, is advantageous since it allows the battery to be changed once it has run out.

Regarding the constructive characteristics inherent in the bottom bracket assembly 1, what has been stated with reference to the embodiment of FIG. 1 applies also to FIG. 4, with the sole difference being that the nut 33 has the first portion 33a with the substantially cylindrical hole at the shaft element 22 associated with the left crank arm 18 and the second portion 33b with the hole having an inner surface shaped to receive the closing tool (at the shaft element 21 associated with the right crank arm 17).

There is an alternative embodiment that has not been illustrated in which the positioning of the detection unit 100a with respect to the bottom bracket assembly 1 is a mirror image of that in FIG. 4, i.e. the battery 103 can be inserted in the cavity 21a of the shaft element 21 associated with the right crank arm 17, and the nut 33 has the portion 33b with the substantially cylindrical hole at the shaft element 21 and the portion 33a with the inner surface shaped to receive the closing tool at the shaft element 22 associated with the left crank arm 18, substantially as illustrated in FIG. 1.

Figure 5:
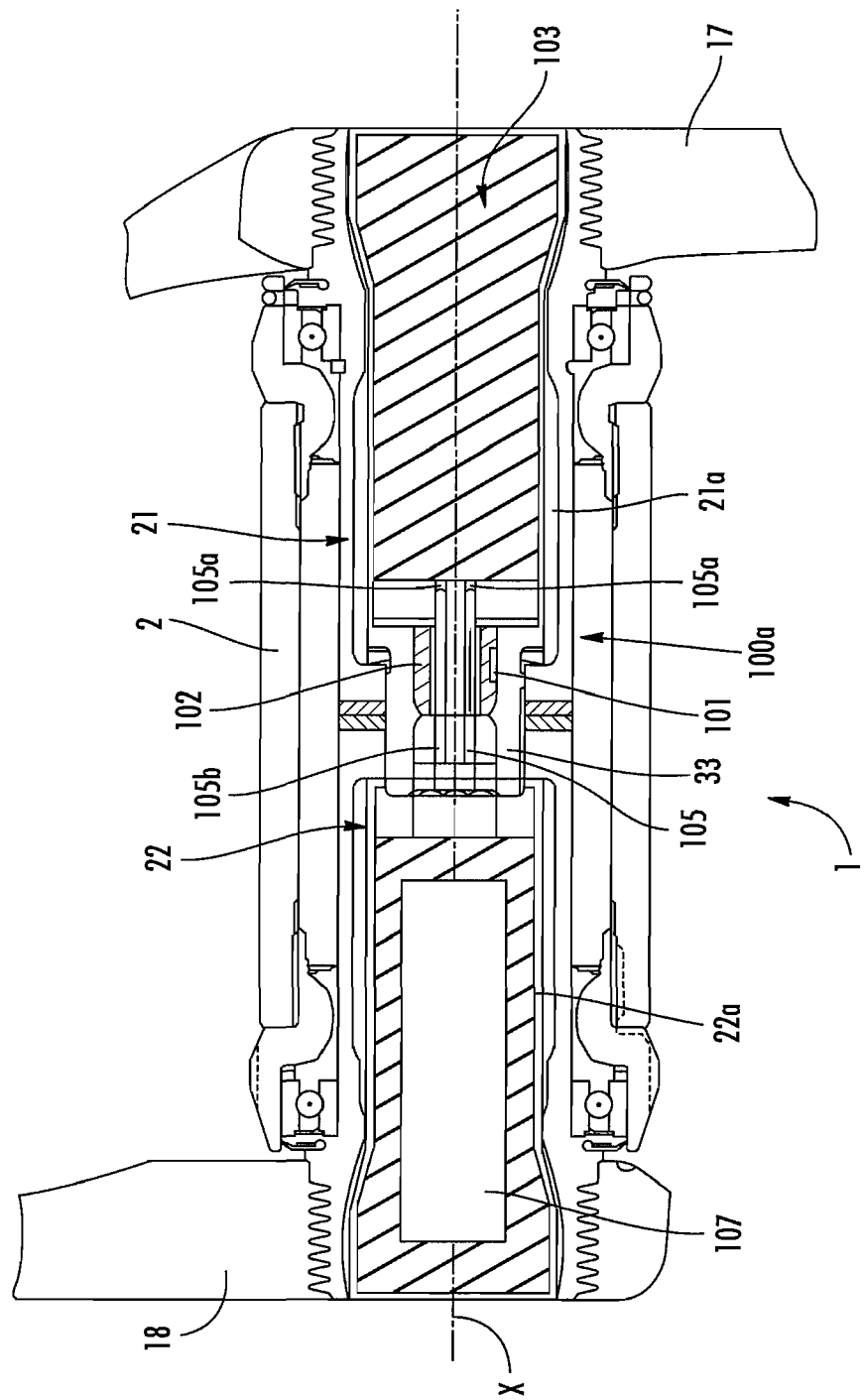
FIG. 5 is a schematic longitudinal sectional view of a fifth embodiment of the bicycle component.

FIG. 5 shows an alternative embodiment of the bottom bracket assembly 1. Elements in FIG. 5 corresponding to those illustrated in FIG. 1 are indicated with the same reference numerals.

The embodiment illustrated in FIG. 5 differs from the one illustrated in FIG. 1 in that a second power supply device (typically a battery), 107 in the form of a cartridge is provided, wherein this additional power supply device can be inserted at the shaft element 22 associated with the left crank arm 18. The additional battery 107 comprises male connectors 105b that cross the inside of the nut 33 to connect with the female connectors 106a of the battery 103. Such a configuration is advantageous when the bicycle is intended to be used for a long time because it allows the autonomy of the detection unit 100a to be increased.

There is an alternative embodiment that has not been illustrated in which the positions of the battery 103 and of the additional battery 107 are reversed, the battery 103 being provided at the shaft element 22 associated with the left crank arm 18 and the additional battery 107 being provided at the shaft element 21 associated with the right crank arm 17.

Figure 6:
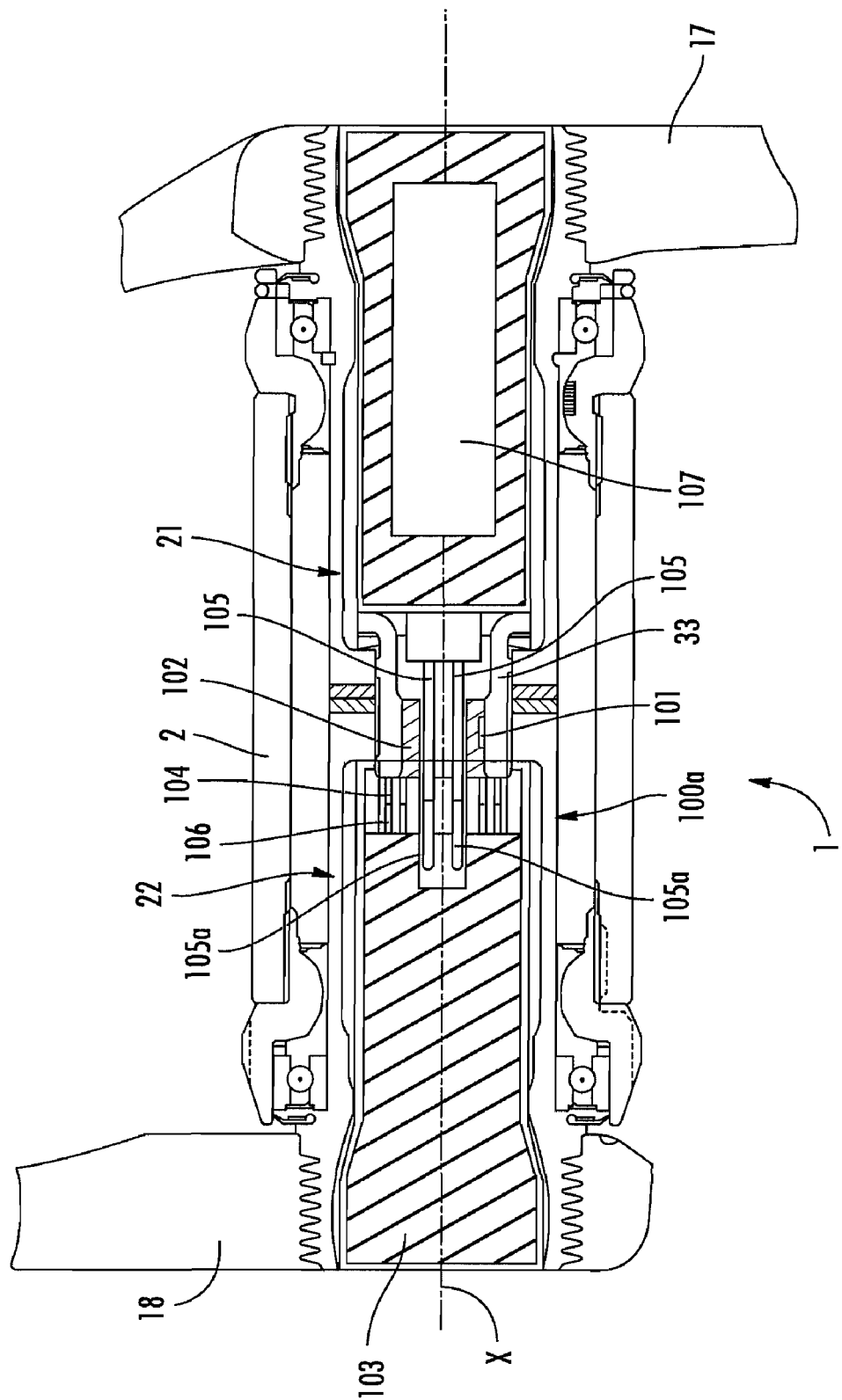
FIG. 6 is a schematic longitudinal sectional view of a sixth embodiment of the bicycle component.

FIG. 6 shows an alternative embodiment of the bottom bracket assembly 1. Elements in FIG. 6 corresponding to those illustrated in FIGS. 1, 4 and 5 are indicated with the same reference numerals.

The embodiment illustrated in FIG. 6 differs from the one illustrated in FIG. 4 in that an additional battery 107 in the form of a cartridge is provided, wherein this additional battery can be inserted at the shaft element 21 associated with the right crank arm 17. The additional battery 107 comprises male power connectors 105b that cross the inside of the nut 33 to connect to the female connectors 106a of the battery 103. Such a configuration has the same advantages as that which is illustrated in FIG. 5.

There is an alternative embodiment that has not been illustrated in which the positions of the battery 103 and of the additional battery 107 are reversed, the battery 103 being provided at the shaft element 21 associated with the right crank arm 17 and the additional battery 107 being provided at the shaft element 22 associated with the left crank arm 18, substantially as illustrated in FIG. 5.

Figure 7:
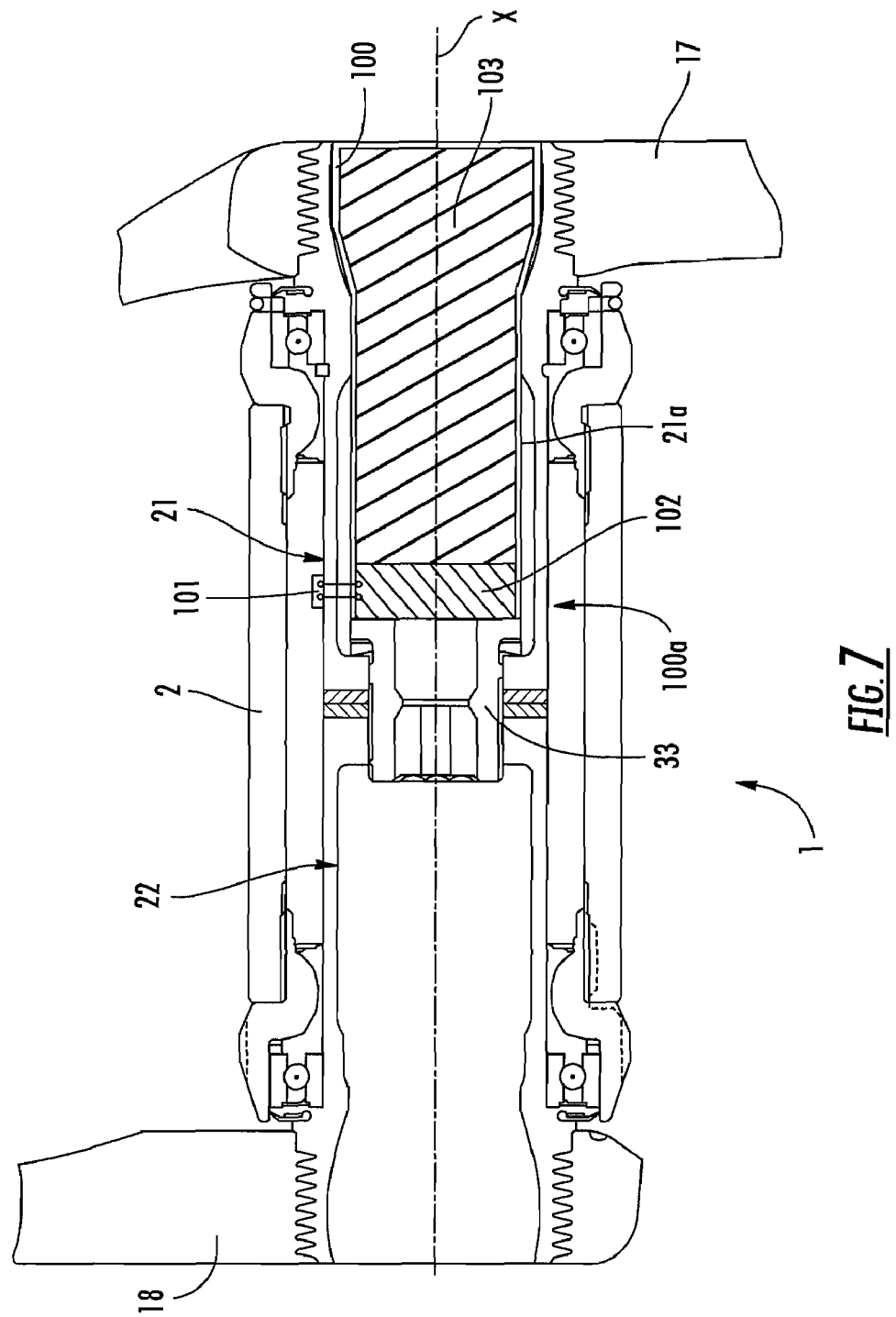
FIG. 7 is a schematic longitudinal sectional view of a seventh embodiment of the bicycle component.

FIG. 7 shows an alternative embodiment of the bottom bracket assembly 1. Elements in FIG. 7 corresponding to those illustrated in FIG. 1 are indicated with the same reference numerals.

The embodiment illustrated in FIG. 7 differs from the one illustrated in FIG. 1 in that the processing unit 102 is outside of the nut 33 and fixedly connected to the battery 103. In this embodiment, the battery 103 and the processing unit 102 are housed in the case 100 that can be inserted in the cavity 21a of the shaft element 21 associated with the right crank arm 17.

The strain-gauges 101 in this case are positioned on the outer surface of the shaft element 21 at an area where the wall of the shaft element 21 is thinner. Alternatively, the strain-gauges 101 can be positioned in the same area, but associated with the inner surface of the shaft element 21.

There is an alternative embodiment that has not been illustrated in which the position of the detection unit 100a is mirror-like the one illustrated in FIG. 7, i.e. with the components of the detection unit 100a associated with the shaft element 22 associated with the left crank arm 18.

Figure 8:
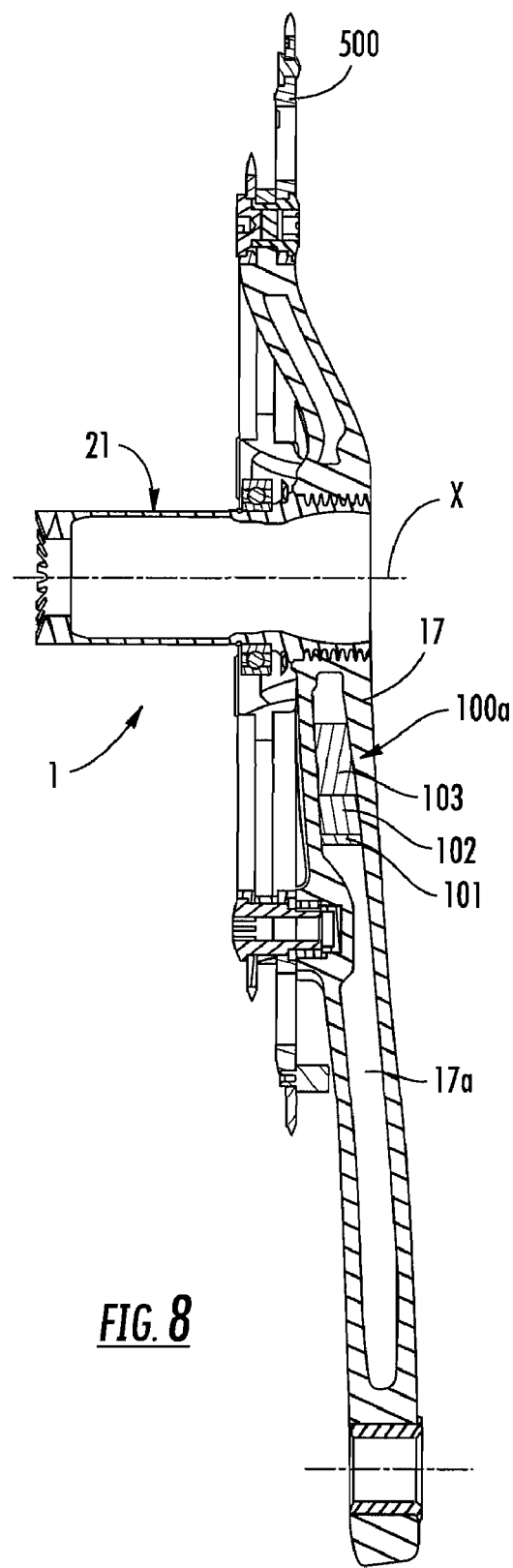
FIG. 8 is a schematic longitudinal sectional view of an eighth embodiment of a portion of the bicycle component.

FIG. 8 illustrates a further embodiment of the bottom bracket assembly 1. Elements in FIG. 8 corresponding to those illustrated in FIG. 1 are indicated with the same reference numerals.

The embodiment of FIG. 8 differs from the one of FIG. 1 in that the battery 103, the processing unit 102 and the strain-gauges 101 are housed in a cavity 17a of the right crank arm 17. Preferably, the aforementioned elements are housed in an area of such a cavity close to the coupling end of the crank arm 17 with the shaft element 21, so as to safeguard the inertia of the crank arm 17 and detect greater tension values. In this case, the bending deformation of the crank arm 17 is the main parameter being detected, from which it is possible to calculate the torque applied by the cyclist. The cavity 17a of the crank arm 17 could be made so as to be open in a first assembly step and then be closed with a cover after the detection unit 100a has been introduced into the cavity.

There is an alternative embodiment in which the detection unit 100a is housed in the left crank arm 18.

Figure 9:
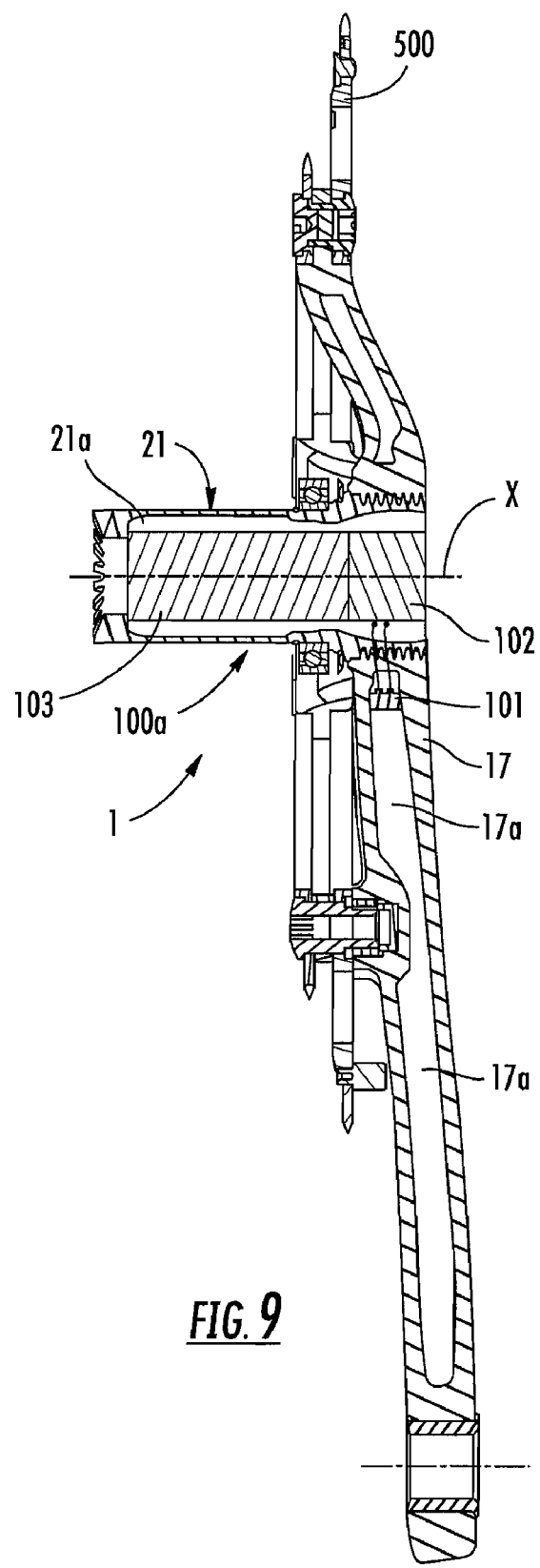
FIG. 9 is a schematic longitudinal sectional view of a ninth embodiment of the bicycle component.

FIG. 9 illustrates a further embodiment of the bottom bracket assembly 1. Elements in FIG. 9 corresponding to those illustrated in FIGS. 1 and 8 are indicated with the same reference numerals.

The embodiment of FIG. 9 differs from that of FIG. 8 in that here the heavier elements of the detection unit 100a, i.e. the battery 103 and possibly also the processing unit 102, are housed in the cavity 21a of the shaft element 21, so as to safeguard the inertia of the crank arm 17, whereas the strain-gauges 101 are housed in the cavity 17a of the right crank arm 17, or possibly also on the outer surface thereof, to measure mainly the bending deformation thereof.

As illustrated in FIG. 9, the strain-gauges 101 are positioned closer to the shaft element 21 than to the pedal.

Figure 10:
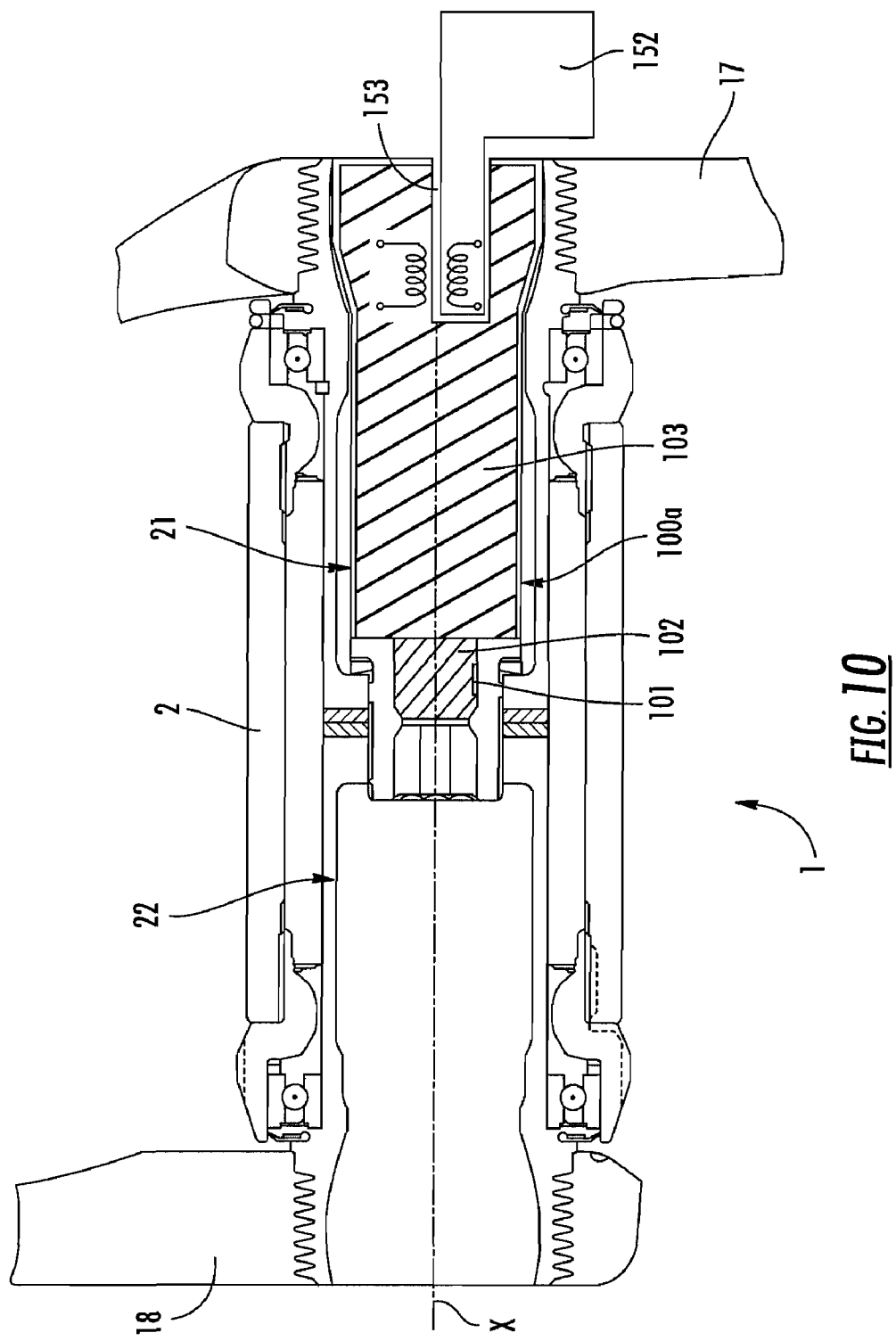
FIG. 10 is a schematic longitudinal sectional view of a tenth embodiment of the bicycle component.

In all of the embodiments described above, it is possible to use a rechargeable battery 103, preferably of the type that is rechargeable by induction. In this case, recharging can be carried out by bringing the recharging instrument close to the bicycle without needing to provide external connectors, which would create insulation problems. An embodiment of a detection unit 100a that uses a battery that is rechargeable by induction is illustrated in FIG. 10. Here, a battery-charger 152 is inserted into a seat 153 formed in the battery 103. In another embodiment that has not been illustrated, a photovoltaic cell is used suitable for cooperating with the battery 103.

In all of the embodiments described above, the strain-gauges 101 can be applied directly onto one of the shaft elements 21, 22. The positioning of the strain-gauges 101 on the shaft element is done in a way which is suitably to solve measurement problems that arise due to the particular operation of the bicycle.

FIG. 11 schematically illustrates the tensions that are generated in the various areas of a shaft 23 when it is subjected to a torque. It should be noted how the areas in which there is greater concentration of tension are those at the thinner walls of the shaft 23. These areas are the preferred areas for the positioning of the strain-gauges.

However, it must be considered that the tension generated on the shaft, and therefore the deformation that can be detected with the strain-gauges, does not just depend upon the torque, but also upon the bending and the dilation due to temperature variations and/or axial forces. In particular, the deformation stresses of the shaft are not constant, but have maximum and minimum values according to the angular position of the crank arms. As is known to a person having ordinary skill in the art, the cyclist exerts the maximum thrust upon the crank arms when they are in the area between the vertical position with the crank arm on top and the horizontal position with the crank arm in front. Additionally, it must be considered that the only crank arm that transmits a torque to the shaft is the left crank arm, due to the fact that the right crank arm transmits the torque directly to the front sprocket with which it is coupled (such a front sprocket is indicated with 500 in FIGS. 8 and 9). The front sprocket in turn transmits the torque to the rear wheel through the chain. It must also be considered that both of the crank arms generate a bending stress on the shaft; the strain-gauges shall thus detect a deformation even when in reality there is no torque applied by the cyclist.

Consider for example the case in which, instead of the four strain-gauges illustrated in FIGS. 1*a*, 1*b* and 1*c* connected together in a Wheatstone bridge, a single strain-gauge is used. Such a strain-gauge is associated with the shaft 23 in an angular position corresponding to the one in which the neutral axis of the shaft is located with respect to the crank arms 17, 18 when they are at 45° with respect to the horizontal direction. The position of the neutral axis is indicated as Z in FIG. 12*b*, and different examples of the angular position in which the strain-gauge can be positioned are designated as A in FIGS. 12*a*, 12*c* and 12*d*, which schematically represent the position of the crank arms 17, 18 in three different operative conditions, i.e. respectively at the moment when the cyclist starts thrusting on the pedals, in the maximum thrusting step and at the moment when he stops thrusting on the pedals. As illustrated in FIG. 12*a*, it is possible to assume an angular tolerance area α with respect to the ideal one indicated by the dark circles, where α is preferably equal to 90°.

Considering the particular shape of the strain-gauge, it is advantageous to position it on the shaft 23 at an interval of angle β, where β is preferably between 40° and 50°, and more preferably equal to 45°, as illustrated in FIG. 13. When the cyclist pushes upon the left crank arm 18 transmitting the torque M to the shaft 23, the latter deforms being subjected to an elongation in the direction of the arrow S1 and a contraction in the direction of the arrow S2. For this reason it is advantageous to orient the strain-gauge 101 with its direction of deformation according to arrow S1 so that the magnitude of the detected signal is as large as possible.

FIGS. 14*a* and 14*b* illustrate alternative positionings of the strain-gauge 101 for detecting a signal representative of the torque on the shaft 23, while being influenced as little as possible by bending stress. In FIGS. 14*a* and 14*b*, it should be noted that when at a crank arm, for example the right crank arm 17, the bending deformation F is at its maximum value, and at the other crank arm, for example the left crank arm 18, such a deformation is zero. Considering that the torque M is only present on the shaft 23 when the cyclist pushes upon the left crank arm 18, it is possible to obtain a signal proportional to just the torque exerted upon the shaft 23 by positioning a single strain-gauge 101 at the right bearing 13 (FIG. 14*b*), and only detecting the signal when a cadence sensor (or position or movement sensor), indicates that the left crank arm 18 is in a thrusting position (i.e. within the angular range of size α of FIG. 12*a*), and preferably in the maximum thrust position. However, it is considered acceptable to position the strain-gauge 101 at an axial distance x from the bearing 13 of between 0 and 20 mm. Alternatively, a strain-gauge can be positioned at each bearing, as schematically illustrated in FIG. 14*a*, by exploiting the cadence signal to determine the position of the crank arms 17, 18 and subtract the signal detected by the strain-gauge 101 positioned at the right bearing 13 when the cyclist pushes upon the right crank arm 17, from the signal detected by the strain-gauge 101 positioned at the left bearing 14 when the cyclist pushes upon the left crank arm 18.

Let us now consider the case in which two strain-gauges are used. As illustrated in FIG. 15*a*, the two strain-gauges 101 can be positioned on the shaft 23 in any angular position and at any axial position, orientating the two strain-gauges so that the respective directions of deformation are perpendicular to one another. By orienting the strain-gauges in this way, possible contributions caused by bending and/or traction stresses are eliminated with a differential measurement. By connecting the two strain-gauges according to a classic ½ bridge scheme, the difference between the signal generated by the first strain-gauge and that generated by the second strain-gauge is proportional to just the torque applied to the shaft 23.

In an alternative configuration that has not been illustrated, the two strain-gauges are not one on top of the other like in FIG. 15*a*, but are associated with the shaft at diametrically opposite areas.

A particularly preferred configuration is the one illustrated in FIG. 15*b*, in which two pairs of strain-gauges 101 are used, the strain-gauges being connected according to a Wheatstone bridge scheme, as is illustrated in FIGS. 1*a*-1*c*. In this configuration, advantageously, the detected signal is of a magnitude greater than the one detected with the configuration of FIG. 15*a*.

In an alternative embodiment of the detection unit 100*a* of the bottom bracket assembly 1, a piezoelectric element is used, i.e. an element capable of generating a potential difference when subjected to a pressure, in place of the strain-gauges. Such an element acts both as an energy source and as a signal generator. If the piezoelectric element is positioned so as to be compressed when the cyclist pushes upon the left crank arm, the potential difference obtained is a signal directly proportional to such a torque applied by the cyclist to the shaft of the bottom bracket assembly.

Since the magnitude of the energy produced by the piezoelectric element is not high, an additional battery is preferably used to supply possible electronic parts like the possible amplifier, A/D converter, and RF transmitter of FIGS. 1*a*-1*c*.

FIG. 16 shows a first embodiment of the bottom bracket assembly 1 in which a detection unit 100*a* comprising a piezoelectric element 301 is used. The piezoelectric element 301 is arranged between the matching surfaces of the teeth of the front toothings (preferably of the Hirth type), provided at the end portions 29, 30 of the shaft elements 21, 22. More specifically, the piezoelectric element 301 is housed in a suitable seat 301*a* formed, for example, by reducing the size of a tooth. It is also possible to see the processing unit 102 of the signals detected by the piezoelectric element 301 and the battery 103, which in this case supplies just the processing unit 102.

The processing unit 102 and the battery 103 are housed in the cavity 21*a* of the shaft element 21. The processing unit 102 can be of the type illustrated in FIGS. 1*a*-1*c*.

In an alternative embodiment of the detection unit 100*a*, illustrated in FIGS. 17 and 18, the piezoelectric element 301 is housed between the matching surfaces of the teeth of the front coupling toothings of the shaft element 22 and the crank arm 18, whereas the processing unit 102 and the battery 103 are housed in the cavity 22*a* of the shaft element 22.

In the embodiments of FIGS. 16-18, the signal generated by the piezoelectric element 301 is directly proportional to the pressure exerted upon the outer surface of the piezoelectric element, which is in turn directly proportional to the torque applied to the shaft element 22 by the cyclist who pushes upon the pedal of the left crank arm 18. The signal coming out from the processing unit 102 is therefore proportional to the torque applied by the cyclist to the shaft (or to the shaft element), of the bottom bracket assembly.

According to a further alternative embodiment of the detection unit 100a, illustrated in FIG. 19, the piezoelectric element 301, the battery 203 and the processing unit 102 are embedded in the body of the crank arm, which in this case is preferably made from molten composite material, for example carbon fiber. Alternatively, the aforementioned elements can be inserted into suitable pockets (not illustrated), made in the body of the crank arm. The orientation of the piezoelectric element is such that it is subjected to pressures on upper and lower surfaces thereof due to the compression to which the areas of the body of the crank arm are subjected while pedaling. Such pressures have a value proportional to the torque imparted by the cyclist while pedaling.

The detected deformation signal could alternatively also be used as a warning signal to indicate that the crank arm needs to be changed because it has been subjected to too great a deformation (for example above a predetermined threshold value), and could therefore start to wear.

FIG. 20 illustrates a further embodiment of the bottom bracket assembly 1, in which the piezoelectric element comprises the washer 133 which is made from piezoelectric material and arranged between the radial flange 34 of the nut 33 and the inner wall of the shaft element 21. By means of the particular geometry of the Hirth toothing provided at the end portions 29, 30 of the shaft elements 21, 22, the transfer of torque from one shaft element to the other generates a separation thrust in the axial direction of the two shaft elements, compressing the washer 133 against the radial flange 34 of the nut 33.

The invention has up until now been described with reference to a mobile component of a bicycle. It can also be applied to fixed components like, for example, the frame, the seat post, or the handlebars of the bicycle. In this case the detection unit detects the passage from a first tensional state to a second tensional state of the component and the generated signal can be used for example as an alarm signal to the reaching of critical tensions or to indicate that it is necessary to replace the component.

FIG. 21 illustrates for example a bicycle 400 in which the areas of various components of the bicycle in which it is possible to associate the detection unit 100a are highlighted. As illustrated, such a unit can be associated with the crank arm 17, for example at an area B thereof, with the shaft 23 of the bottom bracket assembly, for example in an area C thereof, with the frame 401 of the bicycle, for example in an area D thereof, with the seat post 402, for example in an area E thereof, with the handlebars 403, for example in an area F thereof, with the hub 404 of the wheel 405, for example in an area G thereof, with the rim 406 of the wheel 405, for example in an area H thereof, etc.

The invention has also always been described with reference to an electrical energy source (battery or piezo-electric crystal), and to a generator of an electrical signal varied according to the stress imparted upon the component (piezo-electric crystal itself or strain-gauge). However, other types of source and signals can be used. For example, it is possible to use a magnetic or electromagnetic field source and a varier of such a field. The power supply signal and the representative signal are of the same type (for example, electrical signals), but the case in which such signals are of different types (for example, electrical and magnetic signals), is not excluded.

A person having ordinary skill in the art would recognise that it is possible to combine the various characteristics of the embodiments described above to obtain further embodiments, all of which are in any case covered by the present invention as defined by the subsequent claims.

What is claimed is:

1. An instrument-equipped bicycle component comprising a detection unit, the bicycle component comprising at least two parts that do not move relative to one another, and the detection unit comprising a detector located at an axial coupling that joins adjacent axial ends of the at least two parts for detecting at least one parameter representative of a stress exerted on the component at the axial coupling.

2. The component of claim 1, wherein the component is mobile with respect to the bicycle frame while the bicycle is traveling, and the detection unit can move as a single piece with the component with respect to the bicycle frame.

3. The component of claim 2, further comprising a main body that can rotate about a rotation axis, wherein the detection unit rotates as a single piece with the main body.

4. The component of claim 1, wherein the detection unit comprises at least one generator of at least one signal representative of the stress.

5. The component of claim 4, wherein the detection unit comprises at least one power supply device associated with the at least one generator of a signal representative of the stress.

6. The component of claim 4, wherein the detection unit comprises at least one transmission device for transmission of the signal generated by the at least one generator.

7. The component of claim 4, wherein the detection unit further comprises at least one processing unit for processing of the signal generated by the at least one generator of a signal representative of the stress.

8. The component of claim 1, wherein the component is made from composite material and the detection unit is incorporated into the composite material.

9. The component of claim 1, wherein the component defines at least one cavity, and the detection unit is at least partially housed in the at least one cavity.

10. The component of claim 9, wherein the detection unit comprises at least one power supply device associated with the at least one generator, wherein the at least one power supply device is housed in the at least one cavity.

11. The component of claim 9, wherein the detection unit further comprises:
at least one generator of at least one signal representative of the stress; and
at least one transmission device for transmission of the signal generated by the at least one generator of a signal representative of the stress;
wherein the at least one transmission device is housed in the at least one cavity.

12. The component of claim 9, wherein:
the detection unit comprises at least one generator of at least one signal representative of the stress;
the detection unit comprises at least one power supply device associated with the at least one generator;
the at least one generator of a signal representative of the stress is housed in the at least one cavity.

13. The component of claim 9, wherein the detection unit is entirely housed in the at least one cavity.

14. The component of claim 9, wherein the component further comprises an outer surface and the at least one generator is associated with the outer surface.

15. The component of claim 1, wherein the parameter is representative of the tension exerted on the component.

16. The component of claim 15, wherein:
the detection unit further comprises at least one generator of at least one signal representative of the stress, and at least one processing unit for processing of the signal generated by the at least one generator;

the processing unit compares the signal representative of the tensional state of the component with a reference signal.

17. The component of claim 16, wherein the signal is representative of the torque exerted upon the component by a cyclist while pedaling.

18. The component of claim 1, wherein the component is any one chosen from the group consisting of:
a shaft of a bottom bracket assembly;
a crank arm;
a bottom bracket assembly;
a threaded element of a bottom bracket assembly;
a hub of a wheel;
a rim of a wheel;
a bicycle frame;
a seat post; and
a handlebar.

19. The component of claim 18, wherein:
the detection unit comprises:
at least one generator of at least one signal representative of the stress;
at least one power supply device associated with the at least one generator; and
at least one transmission device for transmission of the signal generated by the at least one generator;
the component is a bottom bracket assembly comprising a shaft and at least one crank arm associated with a free end portion of the shaft;
the at least one power supply device and the at least one transmission device are associated with the shaft; and
the at least one generator is associated with the at least one crank arm.

20. The component of claim 18, wherein:
the detection unit comprises:
at least one generator of at least one signal representative of the stress;
at least one power supply device associated with the at least one generator; and
at least one transmission device for transmission of the signal generated by the at least one generator;
the component is a bottom bracket assembly comprising a shaft and at least one threaded element capable of being threaded with said shaft;
the at least one power supply device and the at least one transmission device are associated with the shaft; and
the at least one generator is associated with the at least one threaded element.

21. The component of claim 20, wherein the at least one generator is associated with an intermediate support element associated with the at least one threaded element.

22. The component of claim 19, wherein the at least one power supply device and the at least one transmission device are connected together through electrical connectors.

23. The component of claim 6, wherein the at least one generator and the at least one transmission device are connected together through electrical cables.

24. The component of claim 5, wherein the at least one power supply device comprises at least one battery.

25. The component of claim 24, wherein the at least one battery is rechargeable.

26. The component of claim 25, wherein the at least one battery is rechargeable by induction.

27. The component of claim 5, wherein the at least one power supply device comprises at least one piezoelectric element.

28. The component of claim 24, wherein the at least one generator comprises at least one strain-gauge connected to the at least one battery.

29. The component of claim 28, wherein the at least one generator comprises two strain-gauges arranged according to perpendicular directions.

30. The component of claim 29, wherein the two strain-gauges are placed one above the other.

31. The component of claim 29, wherein the two strain-gauges are arranged in axially opposite areas of the component.

32. The component of claim 28, wherein the at least one generator comprises two pairs of strain-gauges.

33. The component of claim 28, wherein the at least one generator comprises four strain-gauges connected so as to define a strain-gauge bridge.

34. The component of claim 6, wherein the at least one transmission device comprises sliding contacts.

35. The component of claim 6, wherein the at least one transmission device comprises a radio frequency transmitter.

36. The component of claim 35, wherein:
the component defines at least one cavity; and
the radio frequency transmitter comprises an antenna, a portion of the antenna being housed in the at least one cavity of the component and a portion of the antenna extending out from the at least one cavity.

37. The component of claim 6, wherein the at least one transmission device comprises a pair of solenoids.

38. The component of claim 6, wherein the detection unit comprises a first power supply device for supplying power to the at least one transmission device.

39. The component of claim 38, wherein the first power supply device comprises a battery.

40. The component of claim 38, further comprising a second power supply device for supplying power to the at least one transmission device.

41. The component of claim 6, wherein the detection unit comprises at least one signal amplifier arranged between the at least one generator and the at least one transmission device.

42. The component of claim 41, wherein the detection unit comprises a first power supply device for supplying power to the at least one generator and a second power supply device for supplying power to the at least one signal amplifier.

43. The component of claim 42, wherein the second power supply device comprises a battery.

44. The component of claim 5, wherein the detection unit comprises a switch for actuating the at least one power supply device.

45. The component of claim 1, wherein the detection unit comprises an operation indicator LED.

46. The component of claim 1, wherein the detection unit comprises a calibration or diagnosis switch.

47. The component of claim 1, wherein the detection unit comprises a cadence sensor.

48. The component of claim 27, wherein the at least one piezoelectric element constitutes the at least one generator of a signal representative of the stress.

49. A detection unit capable of detecting at least one parameter representative of a stress exerted upon a shaft of a bicycle bottom bracket assembly, the detection unit located at an axial coupling that joins adjacent axial ends of a first section of the shaft and a second section of the shaft and configured so to be inserted into at least one axial cavity of the shaft.

50. The detection unit of claim 49, wherein the detection unit comprises an outer housing case.

51. The detection unit of claim 49, wherein the detection unit can be fixedly associated with a threaded element that can be inserted into the at least one cavity.

52. The detection unit of claim 49, wherein the detection unit, comprises at least one generator of at least one signal representative of said stress.

53. The detection unit of claim 52, further comprising a first power supply device associated with the at least one generator.

54. The detection unit of claim 53, further comprising at least one transmission device for transmission of the signal generated by the at least one generator.

55. The detection unit of claim 52, further comprising at least one processing unit for processing of the signal generated by the at least one generator.

56. The detection unit of claim 54, wherein the power supply device and the at least one transmission device are connected through electrical connectors.

57. The detection unit of claim 54, wherein the at least one generator and the at least one transmission device are connected together through electrical cables.

58. The detection unit of claim 53, wherein the power supply device comprises at least one battery.

59. The detection unit of claim 58, wherein the at least one battery is rechargeable.

60. The detection unit of claim 59, wherein the at least one battery is rechargeable by induction.

61. The detection unit of claim 53, wherein the power supply device comprises at least one piezoelectric element.

62. The detection unit of claim 58, wherein the at least one generator comprises at least one strain-gauge connected to the at least one battery.

63. The detection unit of claim 62, wherein the at least one generator comprises two strain-gauges.

64. The detection unit of claim 63, wherein the two strain-gauges are placed one above the other.

65. The detection unit of claim 62, wherein the at least one generator of a signal representative of the stress comprises two pairs of strain-gauges.

66. The detection unit of claim 62, wherein the at least one generator comprises four strain-gauges connected so as to define a strain-gauge bridge.

67. The detection unit of claim 54, wherein the at least one transmission device comprises sliding contacts.

68. The detection unit of claim 54, wherein the at least one transmission device comprises a radio frequency transmitter.

69. The detection unit of claim 68, wherein the radio frequency transmitter comprises an antenna.

70. The detection unit of claim 54, wherein the at least one transmission device comprises a pair of solenoids.

71. The detection unit of claim 53, wherein the first power supply device supplies power to the at least one transmission device.

72. The detection unit of claim 71, wherein the first power supply device comprises a battery.

73. The detection unit of claim 71, further comprising a second power supply device.

74. The detection unit of claim 54 wherein the detection unit comprises at least one signal amplifier arranged between the at least one generator and the at least one transmission device.

75. The detection unit of claim 74, wherein the detection unit comprises a second power supply device for supplying power to the at least one signal amplifier.

76. The detection unit of claim 75, wherein the first power supply device supplies power to the signal amplifier.

77. The detection unit of claim 75, wherein the second power supply device comprises a battery.

78. The detection unit of claim 53, comprising a switch for actuating the first power supply device.

79. The detection unit of claim 49, comprising an operation indicator LED.

80. The detection unit of claim 49, comprising at least one of a calibration or diagnosis switch.

81. The detection unit of claim 49, comprising a cadence sensor.

82. The detection unit of claim 61, wherein the at least one piezoelectric element constitutes the at least one signal generator.

83. A bicycle comprising the instrument-equipped component of claim 1.

84. An instrument-equipped bicycle component comprising a detection unit, the detection unit located at least partially within a cavity within the bicycle component, the bicycle component comprising at least two parts that do not move relative to one another, the detection unit comprising a detector that detects at least one parameter representative of a stress exerted on the component, the detector being associated with a fastener that axially couples adjacent axial ends of the at least two parts of the component.

85. An instrument-equipped bicycle component comprising a detection unit that detects at least one parameter representative of a stress exerted upon the bicycle component, the bicycle component comprising at least two parts that do not move relative to one another;
wherein the detection unit is located at an axial coupling that joins adjacent axial ends of the at least two parts of the bicycle component and further comprises at least one generator of at least one signal representative of the stress, and at least one processing unit that processes the signal generated by the at least one generator and compares the signal representative of the stress to a predetermined reference signal.

86. A detection unit that detects at least one parameter representative of a stress exerted upon a shaft of a bicycle bottom bracket assembly, wherein the shaft comprises two longitudinal portions that do not move relative to one another, the detection unit being located at an axial coupling that joins adjacent axial ends of the two longitudinal portions, and configured so to be inserted into at least one cavity of the shaft;
wherein the detection unit comprises at least one generator of at least one signal representative of said stress and the at least one generator comprises at least one strain-gauge housed within the cavity.

87. An instrument-equipped bicycle component comprising a detection unit for detecting at least one parameter representative of a stress exerted upon the bicycle component, the bicycle component comprising at least two coaxial longitudinally extending parts that do not move relative to one another, the parts having a coupling at respective end portions thereof, wherein the detection unit comprises at least one power supply device associated with at least one generator of a signal representative of a stress located at the coupling of the at least two longitudinally extending parts;
wherein the at least one power supply device comprises at least one battery;
wherein the at least one generator comprises at least one strain-gauge connected to the at least one battery, and the at least one generator comprises two pairs of strain-gauges connected so as to comprise a strain-gauge Wheatstone bridge.

88. An instrument-equipped bicycle component comprising a detection unit that detects at least one parameter representative of a stress exerted upon the bicycle component,
  wherein the detection unit comprises:
    at least one generator of at least one signal representative of the stress;
    at least one cadence sensor to generate a cadence signal;
    at least one processor that analyzes the signal representative of stress and the cadence signal to process them into a signal proportional to the power exerted by the cyclist;
    wherein the cadence sensor acts as a switch for actuating the detection unit.

89. An instrument-equipped bicycle component comprising a detection unit that detects at least one parameter representative of a stress exerted upon the bicycle component,
  wherein the detection unit comprises:
    at least one generator of at least one signal representative of the stress;
    at least one processor that analyzes the signal to calculate the pedalling cadence and processes the signal and the pedalling cadence into a signal proportional to the power exerted by the cyclist; and
    a switch that actuates the detection unit when movement of the bicycle component indicative of pedalling is detected.

90. A detection unit capable of detecting at least one parameter representative of a stress exerted upon a bicycle component, and configured so to be inserted into at least one cavity of the bicycle component,
  wherein the detection unit comprises a detector located at an axial coupling that joins adjacent axial ends of at least two longitudinal portions of the bicycle component that do not move relative to one another,
    at least one generator of at least one signal representative of the stress, and
    an elastic support of the at least one generator configured so to be inserted into at least one cavity of the bicycle component.

91. The detection unit of claim 86, wherein the axial coupling is a nut that couples the two longitudinal portions and the detection unit is associated with the nut.

92. An instrument-equipped bicycle component having an included detection unit comprising:
  a bicycle component that is subject to having a stress exerted upon it; and
  a detection unit that detects the application of a stress upon the bicycle component, the detection unit comprising:
    a detector located at an axial coupling that joins adjacent axial ends of at least two parts of the bicycle component that do not move relative to one another;
    a generator that produces a signal representative of the stress upon the component;
    a power supply device associated with the generator; and,
    a movement sensor that activates the power supply device.

93. A stress detection unit for insertion in a cavity defined in a bicycle component, the stress detection unit comprising:
  a generator that produces a signal upon detecting a stress on a bicycle component with which it is associated;
  a power supply device associated with the generator; and
  a movement sensor for actuating the power supply device.

* * * * *